United States Patent [19]

Feiler

[11] Patent Number: 5,159,180
[45] Date of Patent: Oct. 27, 1992

[54] LITIGATION SUPPORT SYSTEM AND METHOD

[76] Inventor: William S. Feiler, 386 Upper Mountain Ave., Upper Montclair, N.J. 07043

[21] Appl. No.: 584,899

[22] Filed: Sep. 19, 1990

[51] Int. Cl.$^5$ .................... G06F 15/20; G06F 15/46; G06F 15/00; G06K 7/10
[52] U.S. Cl. .................... 235/375; 235/376; 235/385; 235/462; 235/472; 364/403
[58] Field of Search ............ 235/375, 385, 376, 377, 235/462, 472; 364/403, 401, 402, 409

[56] References Cited

U.S. PATENT DOCUMENTS

| | | | |
|---|---|---|---|
| 4,264,808 | 4/1981 | Owens et al. | 235/375 |
| 4,283,621 | 8/1981 | Pembroke | 235/375 |
| 4,408,181 | 11/1983 | Nakayama | 235/375 |
| 4,481,412 | 11/1984 | Fields | 235/149 |
| 4,653,021 | 3/1987 | Takagi | 364/900 |

OTHER PUBLICATIONS

ID Systems, vol. 9, No. 9, Nov. 1989, "Bar Codes Prove Their Metal" R. W. Strickland, pp. 38-40.
ID Systems 1989 Buyer's Guide, p. 23.

Primary Examiner—John W. Shepperd
Assistant Examiner—Tan Nguyen
Attorney, Agent, or Firm—Morgan & Finnegan

[57] ABSTRACT

A litigation support system and method in which information regarding documents and other items of evidence are stored in record fields of an electronic database using an optical scanning mechanism with the ability to scan bar-codes or other indicia. By using a bar-code to generate a single relation among databases as well as using bar-code authority lists for entries into the disclosed litigation support computer system, significant improvement in both the speed of coding documents or other items of evidence as well as the accuracy of such coding is greatly enhanced.

30 Claims, 6 Drawing Sheets

Document Type Authority List

| Barcode | Label |
|---|---|
|  | AFFIDAVIT |
|  | AGREEMENT |
|  | APPLICATION |
|  | ARTICLE |
|  | ASSIGNMENT |
|  | CALL REPORT |
|  | CATALOG/BROCHURE |
|  | COMPUTER PRINTOUT |
|  | CURRICULUM VITAE/RESUME |
|  | DRAWING |
|  | FDA - IND |
|  | FDA - PLA |
|  | GRAPH/CHART/TABLE |
|  | HANDWRITTEN NOTE |
|  | LAB NOTEBOOK |
|  | LETTER |
|  | MEMO |

Name, Name-firm Authority List

| Barcode | Entry |
|---|---|
| ‖‖‖‖‖‖ | ARMSTRONG N - ABC CO |
| ‖‖‖‖‖‖ | BACH J - ABC CO |
| ‖‖‖‖‖‖ | CEASARE J - ABC CO |
| ‖‖‖‖‖‖ | CHOPIN F - XYZ ASSOC |
| ‖‖‖‖‖‖ | COLUMBUS C - XYZ ASSOC |
| ‖‖‖‖‖‖ | DEMILE C - ABC CO |
| ‖‖‖‖‖‖ | DISNEY W - XYZ ASSOC |
| ‖‖‖‖‖‖ | DIVINCI L - XYZ ASSOC |
| ‖‖‖‖‖‖ | EINSTEIN A - XYZ ASSOC |
| ‖‖‖‖‖‖ | FEILER W - ABC CO |
| ‖‖‖‖‖‖ | FRANKLIN B - XYZ ASSOC |
| ‖‖‖‖‖‖ | FROST R - ABC CO |
| ‖‖‖‖‖‖ | HAND L - ABC CO |
| ‖‖‖‖‖‖ | JONES J - ABC CO |
| ‖‖‖‖‖‖ | KENNEDY J - XYZ ASSOC |

RECORD: 000001    ⟨TRIAL ⟩    09/14/90

```
Bar_code      A001              Prod_no    1234         Prod_noend 1238
Source        ABC CO            Masked     Y            In_margin  N
Doc_type      MEMO              Doc_date   01/28/66     Total_page 5
Rating        3[,0,1,2,3]       Duplicates NONE
Descript      MEMO FROM: R. FROST TO: L. HAND RE: LAB RESULTS
Key_word
Flag_1            Flag_2            Flag_3      Flag_4            Confid    Y
ProducedtoXYZ ASSOC   Immunity   A/C    NAME    [ ,A/C,A/C W/P,W/P]  Tag
BAR_CODE          ACTION[AUTH,ADDR,COPY]   DEMILE C           NAME_FIRM  Prior_Art
A001              COPY                                        ABC CO     Flag_5
BAR_CODE                                     RELEVANCE/COMMENT PROD_NO
A001                              BIOASSAY RESULTS                       1234
```
⎩ 71

```
         DEPOSITION INFORMATION
DEPO_EXH32        [MARK, ASK, AUTH]
BAR_CODEA001              ACTION MARK
BAR_CODEA001
WITNESS DEMILE C
```
⎩ 73

```
BAR_CODE   TRIAL   TRIAL_EXH
A001               101
WITNESS    DEMILE C
OBJECTION  ILLEG,FED.R.EVID.802
OFFER_ADM AD – JAN 3
```
⎩ 75

Press {Ctrl-w} to Exit

LITIGATION SUPPORT SYSTEM AND METHOD

BACKGROUND AND OBJECTS OF THE INVENTION

I. Field of Invention

A litigation support system and method in which information regarding documents and other items of evidence are stored in record fields of an electronic database using an optical scanning mechanism with an ability to scan bar codes or other indicia means.

II. Description of the Prior Art

Litigation support systems can generally be classified into two different categories, "full text" systems, wherein each document or other item of evidence is either optically scanned and converted into computer readable data or manually keyed into a computer memory, and "bibliographic" systems, wherein only selected information from or about each document or other item of evidence is captured for manipulation by a computer. Both types of systems store and retrieve the recorded data using various computer database systems.

In a full text system, the recorded data is usually retrieved by performing word searches through a full text database. For example, a search might comprise an inquiry to find all documents wherein the word 'litigation' is used within five words of 'anticipate'. A resulting search through the full text database would yield a list of documents or other items of evidence meeting the above search criteria.

The benefits of full text systems have been questioned. First, the cost involved in scanning and converting each document or other item of evidence into a computer readable format to generate a full text database can be substantial. Second, the substantial storage requirements and search times needed to properly access a full text system can render such systems ineffective for litigation purposes. Finally, to establish an accurate full text system, each scanned or manually keyed document must be checked against the original document to assure an accurate conversion has been achieved. As a result of these and other problems associated with full text systems, users frequently decide to only record bibliographic information.

Bibliographic systems offer significant advantages over full text systems. These systems allow specific bibliographic information to be recorded, for example, a document's author, addressee, date, and general subject matter. Bibliographic systems cost less on average to generate and require significantly less storage space compared to full text systems. Additionally, search times are decreased in such systems when compared to full text systems. For a complete analysis of an improved type of bibliographic system see Feiler, William S., "Computer Aided Litigation Support In Patent Litigation", The Journal Of Law And Technology, pp. 177-190 (1983).

Searches in a bibliographic system might be more restricted when compared to full text systems but are still very informative. Searches are usually of the type as follows: all documents wherein Author='Smith J.' and Topic='litigation'. The results of this type of search will be a list of all records that have been "coded" (i.e., recorded) as Author: "Smith J." and Topic: "litigation".

Although bibliographic systems offer advantages over full text systems they do require substantial coding time and accurately stored information. In fact, with bibliographic systems, accurately stored information is extremely important due to the nature of bibliographic search requests. Specifically, if a person who is coding information misspells an author's name, that record may be lost in all searches of the system relating to that author's name.

Using the example stated earlier, a person coding a document authored by John Smith might manually enter "Simth, J.". When a search is performed for Author="Smith J.", the record with the misspelled entry will not be retrieved. As a result, that record will not be identified in that particular search diminishing the value of the bibliographic system.

Additionally, if a person coding a document enters an improper candidate for a record field entry, that misentered record field may not be identified during searches since the improper candidate may not be known to the person who later searches the system. As a result, those misentered records may become lost to the person searching the system further diminishing the value of the bibliographic system.

Continuing with the example as stated above, if a person coding a document types Topic="lawsuit" as a candidate for "litigation," any search of the database for Topic="litigation" will not retrieve that misentered document.

Those skilled in the use of these systems normally take steps to attempt to eliminate the above-identified errors in databases by developing protocols to prevent their introduction. Such steps are far from completely effective and require rigid procedures to try to contain such errors.

Additional problems exist in current bibliographic systems. When coding a bibliographic system repetitive entries are often encountered requiring system operators to retype the same entries with each encounter. Such redundancy is inefficient and adds to the time required to code those entries and can cause potential errors.

Therefore, it is an object of this invention to improve existing litigation support systems by incorporating an optical scanning means capable of recognizing indicia placed on documents or other items of evidence.

Another object of this invention is to create a litigation support system that uses a single indicia means for relating several databases to permit separate and independent coding operations.

Another object of this invention is to use bar code technology in combination with a litigation support system to allow accurate coding and simple retrieval of information.

Another object of this invention is to use an authority list of indicia corresponding to input candidates for record field entries to allow a person to consistently and accurately input information thereby increasing the value of a litigation support system.

Objects and advantages of the invention are set forth herein and will also be readily appreciated here from, or may be learned by practice with the invention. These objects and advantages are realized and obtained by means of instrumentalities and combinations pointed out in the specification and claims.

SUMMARY OF THE INVENTION

The present invention relates to using bar code technology in a litigation support system for two purposes. First, by using a unique bar code on a document a single indicia means is created to be used through out a litigation support system. A single indicia means provides for both an easier method of coding bibliographic information as well as an easier method of recalling information. Second, by generating bar code authority lists for input candidates to be used for particular field entries, the accuracy of a bibliographic system is significantly improved while coding time is reduced thereby adding substantial value to the litigation support system.

BRIEF DESCRIPTION OF THE DRAWINGS

The accompanying drawings illustrate principles and preferred embodiments of the present invention, and together with the description serve to explain the principles of the invention, in which:

FIGS. 3A and 3B show authority lists of input candidates for various record field entries.

FIG. 5 shows a system display screen of the present invention. The screen is used by a system operator to view, edit, or add records and/or code deposition and trial exhibits.

DETAILED DESCRIPTION OF THE DRAWINGS AND PREFERRED EMBODIMENT

The present invention relates to a system and method for improving litigation support systems. By using bar codes in combination with an optical reader to scan document numbers and to generate authority lists for coding those documents, the performance and accuracy of a litigation support system is dramatically improved.

Disclosed below are various preferred embodiments of the claimed invention. Although the systems and methods disclosed in the figures and described herein are directed to the use of bar codes the claimed invention is not limited to same and can be used with any scannable indicia.

Figure 1:
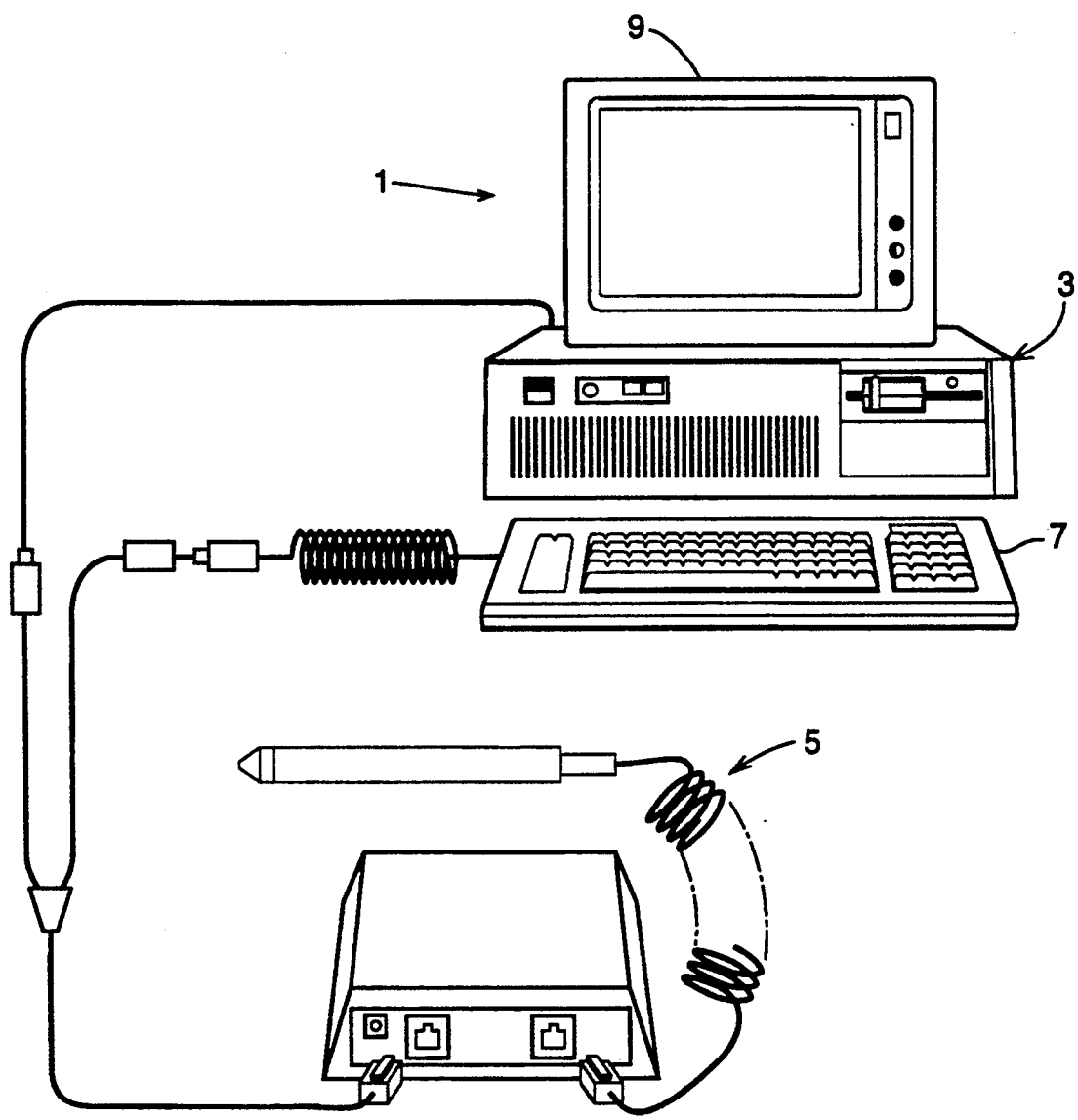
FIG. 1 shows a diagram of the type of hardware used to run a litigation support system of the present invention.

FIG. 1 shows a preferred hardware configuration for the present invention. The litigation support system 1 includes a computer system 3, an optical scanning means 5, here a hand held light pen and interface, a keyboard 7 and a computer monitor 9. A high speed printer, not shown, such a Hewlett Packard Laser printer, is desirable for generating reports. Generally, the preferred central processing unit of computer system 3 for running a completed litigation support system should be at least a 32 bit microprocessor. The use of smaller class microprocessors, i.e. 16 bit or 8 bit microprocessors, may degrade the system's performance and negate the benefits achieved by the present invention. Additionally, the data storage capability for the computer system 3 should have the capacity to store both the system's database software as well as the coded document information. Usually this requires a storage capacity of at least 20 megabytes of disk storage and is most preferably 100 megabytes. As is readily apparent to those skilled in the art, the storage requirement for "fixed-length" field databases, i.e. databases wherein each record field has a fixed character length, is directly proportional to the number of documents or other items of evidence recorded by the litigation support system. As the number of records increase the required storage capacity increases proportionally. Additionally, the amount of bibliographic information recorded per document or other item of evidence, i.e. the number of fields per record, will also effect the storage requirements in a like manner.

The term "document" as used herein is intended to be broadly construed to cover all types of evidence encountered in litigation-type proceedings. The term document means any written, printed, typed or other graphic or photographic matter, including microfilm of any kind or nature, and any electronic storage medium such as cassettes, floppy disks and tapes. Additionally, the term document includes originals and drafts of all papers, books, letters, telegrams, cables, correspondence, contracts, agreements, notes to files, polls, surveys, reports, mechanical and electronic sound recordings or transcripts thereof, calendar or diary entries, memoranda of telephone or personal conversations or of meetings or conferences, studies, intra- and interoffice communications, notes, notations, work papers, price lists, bulletins, circulars, statements, manuals, summaries or compilations, minutes of meetings, maps, charts, graphs, photographs, order papers, articles, announcements, catalogs, records, lists, tables, affidavits, evaluations, journals, summary of accounts, balance sheets, income statements, tabulations, books of account, ledgers, vouchers, canceled checks, invoices, bills or analyses or statistical data, and computer printouts. The term document also includes physical evidence, such as models, samples and demonstrative evidence.

The litigation support system can be run on a variety of different computer and operating systems. The preferred computer system is an IBM personal computer or compatible using PC-DOS or MS-DOS as an operating system. A particularly preferred system is a Compaq Deskpro 386/20e with 110 megabyte disk storage capacity.

Additionally, as is readily apparent to those skilled in the art, the litigation support system identified above can run effectively on currently available portable computer systems. The advantages of using a portable computer systems are several. For example, a person who is responsible for coding documents or other items of evidence can easily transport a portable computer system to where the evidence is located to code same on site and thereby avoid the complexity involved with delivering evidence to a central location. Also, the use of a portable computer system allows a person to operate the litigation support system in a courtroom, at a deposition, or at any other remote cite without having to transport and install a more complicated desktop computer system.

Although any optical scanning means for scanning indicia can be used with the present invention, the use of a hand held light pen or wand is preferred. Generally, the optical scanning means 5 includes an interface between the computer system 3 and keyboard 7 to allow information to be scanned and converted as if the information were typed by hand using keyboard 7. The use of keyboard 7 is preferred when free-text entries are required, for example, attorney comments, document dates, and the like. In the preferred embodiment, bar code readers such as the "WDP Reader" LED light pen by Worthington Data Solutions of Santa Cruz, Calif.

and "EZ Bar code" laser light gun by Time Keeping Systems, Inc. of Cleveland, Ohio have been used with the present invention; the former being preferred for ease of use.

Various types of database software can be used with the present invention. The software compiler used in the preferred embodiment is Clipper TM, Summer 1987 version sold by Nantucket Corporation of Los Angeles, Calif., which uses fixed-length fields. The source code for the preferred program, as described below, is set fourth in Appendixes 1 through 28. Other software is also available which may be used to operate the litigation support system, including for example, Advanced Revelation TM, which uses variable-length fields.

Clipper TM, as well as other current database software, allows a system operator to set up various databases with numerous record fields within each database. The structuring freedom of Clipper TM allows the stored information to be sorted or searched in a variety of ways thereby increasing a system's overall value. Nevertheless, as is readily apparent to those skilled in the art, the more fields created per record the more inputting or "coding" is required to complete a record and more data storage is required for the record information. Therefore, the choice of how and what bibliographic information is to be recorded, i.e. the number and type of topical databases to use and the number of fields to use per database record, should be made wisely.

Figure 2:
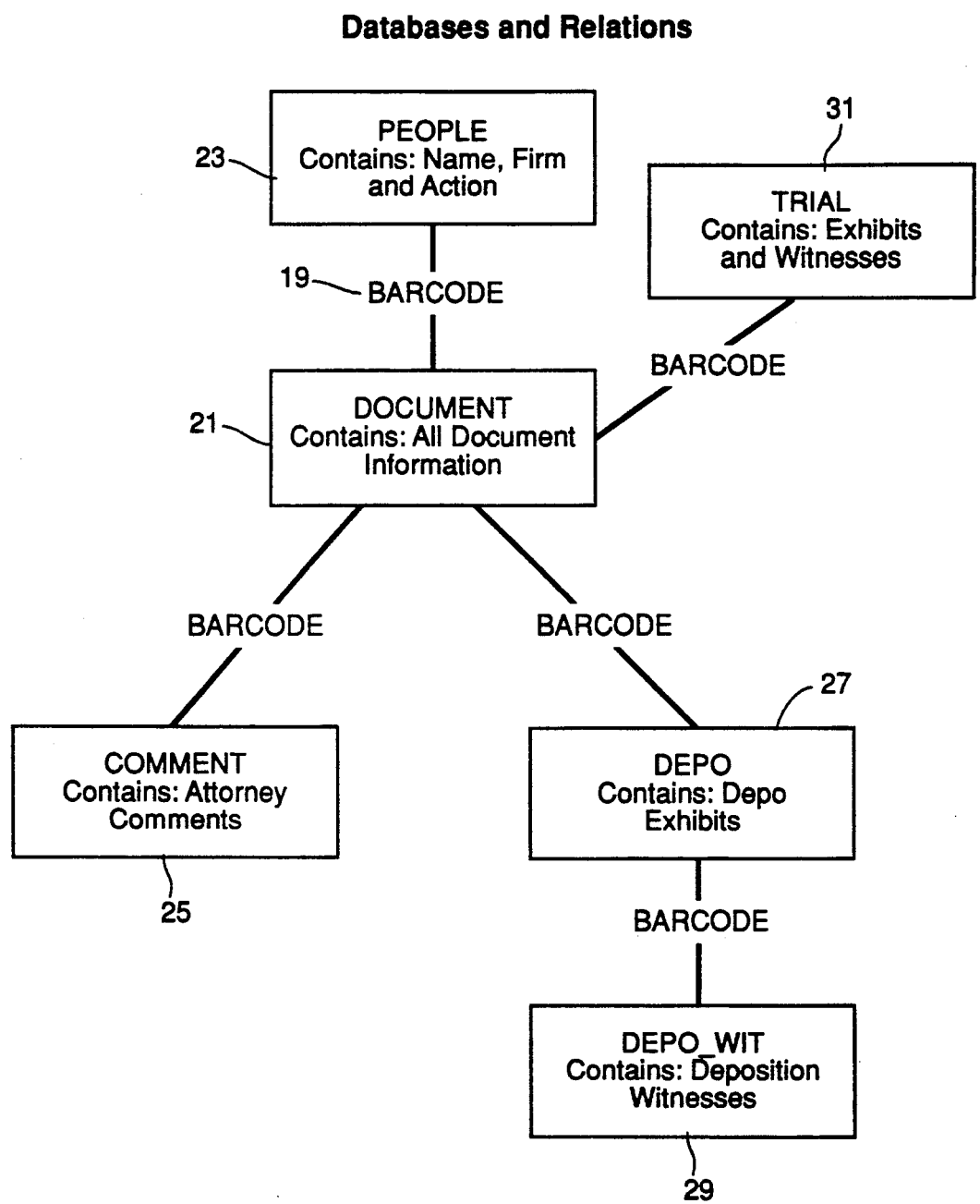
FIG. 2 shows a preferred relational database structure using a single indicia means as a relation between topical databases.

FIG. 2 shows a preferred relational database which comprises six separate topical databases. The Document database 21 of the litigation support system contains all document information including a document's bar code, production number, description and the like. The People database 23 contains the names of all the people identified in a document as well as the company they work for and whether they have been an author or addressee for a particular document or group of documents. The Comment database 25 contains all attorney comments for the documents stored on the litigation support system. The Deposition database 27 contains information relating to all of the exhibits identified during depositions. The Deposition Witness database 29 contains information relating to all of the deposition witnesses. The Trial database 31 contains information relating to all of the exhibits and witnesses used at trial.

All of the separate databases are related through a unique bar code 19. By establishing a relational database with a unique code to identify each document, the simplicity of retrieving all information related to a particular document is dramatically improved. A system user can quickly scan a bar code off of any document and interrogate the system to retrieve information stored in the relational databases relating to that document.

Tables 1 through 6 listed below indicate the preferred fields per database record for each of the related topical databases:

TABLE 1

DOCUMENT DATABASE

| Field | Field Name | Type | Width |
|---|---|---|---|
| 1 | BAR_CODE | Character | 15 |
| 2 | PROD_NO | Character | 15 |
| 3 | PROD_NO_END | Character | 15 |
| 4 | TOTAL_PAGE | Character | 4 |
| 5 | DUPLICATES | Character | 26 |
| 6 | SOURCE | Character | 10 |
| 7 | DOC_DATE | Character | 8 |
| 8 | MASKED | Character | 1 |

TABLE 1-continued

DOCUMENT DATABASE

| Field | Field Name | Type | Width |
|---|---|---|---|
| 9 | IN_MARGIN | Character | 1 |
| 10 | DOC_TYPE | Character | 15 |
| 11 | CONFID | Character | 1 |
| 12 | DESCRIPT | Character | 50 |
| 13 | KEY_WORD | Character | 50 |
| 14 | RATING | Character | 1 |
| 15 | TAG | Character | 2 |
| 16 | PRIOR_ART | Character | 2 |
| 17 | IMMUNITY | Character | 10 |
| 18 | PRODUCEDTO | Character | 15 |
| 19 | FLAG_1 | Character | 5 |
| 20 | FLAG_2 | Character | 5 |
| 21 | FLAG_3 | Character | 5 |
| 22 | FLAG_4 | Character | 5 |
| 23 | FLAG_5 | Character | 5 |

TABLE 2

PEOPLE DATABASE

| Field | Field Name | Type | Width |
|---|---|---|---|
| 1 | BAR_CODE | Character | 15 |
| 2 | NAME | Character | 30 |
| 3 | NAME_FIRM | Character | 10 |
| 4 | ACTION | Character | 4 |

TABLE 3

COMMENT DATABASE

| Field | Field Name | Type | Width |
|---|---|---|---|
| 1 | BAR_CODE | Character | 15 |
| 2 | PROD_NO | Character | 15 |
| 3 | COMMENT | Character | 50 |

TABLE 4

DEPOSITION EXHIBIT DATABASE

| Field | Field Name | Type | Width |
|---|---|---|---|
| 1 | BAR_CODE | Character | 15 |
| 2 | DEPO_EXH | Character | 20 |

TABLE 5

DEPOSITION WITNESS DATABASE

| Field | Field Name | Type | Width |
|---|---|---|---|
| 1 | BAR_CODE | Character | 15 |
| 2 | WITNESS | Character | 30 |
| 3 | ACTION | Character | 4 |

TABLE 6

TRIAL DATABASE

| Field | Field Name | Type | Width |
|---|---|---|---|
| 1 | BAR_CODE | Character | 15 |
| 2 | TRIAL_EXH | Character | 15 |
| 3 | WITNESS | Character | 75 |
| 4 | OBJECTION | Character | 25 |
| 5 | OFFER_ADM | Character | 20 |

The abbreviated field names in the above Tables are fairly descriptive of the information contained in each record field. Additionally, the preferred field type and width are included to complete each record's structure. Field type and width are used in a database dictionary to allocate storage space for the database's fixed-length fields.

Table 1 represents the preferred fields used for each record stored in the Document database 21. The field BAR_CODE represents the field for the scannable indicia used to identify the particular document, here a bar code. The BAR_CODE or other scannable indicia can be limited to only numeric data or alphabetical data. Preferably, the BAR_CODE field is an "alphanumeric" character string, i.e., capable of being able to record both alphabetical or numeric data, and of at least 8 characters in length. PROD_NO represents the starting production number on the document and PROD_NO END represents the ending production number of the document. If the document is more than one page, the TOTAL_PAGE field is used to calculate the difference between PROD_NO and PROD_NO END. The field DUPLICATES is used to indicate whether duplicates of the document are already in the database. The field SOURCE is used for the source of the document, for example, the name of the firm producing the document. DOC_DATE is the field used to indicate the date of the document. The field MASKED is used to indicate "yes" or "no" as to whether the document has been masked or redacted in production. The field IN_MARGIN is used to indicate whether any handwriting is present in the margin or on the document. The field DOC_TYPE is used to identify the type of document or other item of evidence, for example, memorandum, letter, brochure, floppy disk or cassette. The field CONFID is used to indicate whether the document has been designated as confidential. The field DESCRIPT is used to enter a description of the document. The field KEY_WORD is used to indicate whether any key words are used in the document. The field RATING is used for the rating of the document, usually on a scale of zero to three in order of importance. The field TAG is used to tag the file. The field PRIOR_ART is a field used in patent litigation and indicates whether the document is prior art to a patent in suit. The field IMMUNITY is used to indicate whether there is any immunity against discovery, for example, work product or attorney-client communication. The field PRODUCEDTO is used to indicate to whom the document has been produced for record keeping purposes in multi-party litigations. Finally, FLAG_1 through FLAG_5 are used to flag the document for various document groupings, for example, a foreign language document.

Table 2 represents the preferred fields used for each record stored in the People database 23. The field BAR_CODE is the same field as used in the Document database 21. The field NAME contains the name of the person on a document and the field NAME_FIRM is used to identify the company with which the person's named is affiliated. The field ACTION is used to describe the activity of the person with respect to the document, for example, author, addressee or copy recipient.

Table 3 represents the preferred fields used for each record stored in the Comment database 25. BAR_CODE and PROD_NO are the same fields as used in the Document database 21. The only additional field in Comment database 25 is the COMMENT field. The COMMENT field is used to record any comments regarding the document being coded. As discussed below, comments may be of the free-text variety or from an authority list.

Table 4 represents the preferred fields used for each record stored in the Deposition Exhibit database 27. The BAR_CODE field is the same field as defined above. An additional field called DEPO_EXH is used in the Deposition Exhibit database 27 to define a deposition exhibit number if assigned to the coded document.

Table 5 represents the preferred fields used for each recorded stored in the Deposition Witness database 29. The BAR_CODE field is again the same field as defined above. Additionally, the Deposition Witness database 29 uses a WITNESS field to record the name of the deposition witness and an ACTION field to record the relationship of the witness to the deposition exhibit, for example, authenticated, marked, or examined.

Table 6 represents the preferred fields used for each record stored in the Trial database 31. The BAR_CODE field is the same as defined above. Additionally, the Trial database 31 uses the fields TRIAL_EXH to record the trial exhibit number assigned to the document, WITNESS to record the trial witness' name who is to be examined regarding the document, OBJECTION to record what, if any, objection is made to the use of the document as a trial exhibit, and OFFER_ADM to indicate whether the document was offered into evidence and admitted by the fact finder.

As is readily apparent to those skilled in the art, the relational databases as well as the structures used therein for each database can be varied to suit the particular case where the litigation support system is being used. For example, the above identified Document database 21 has a PRIOR_ART field which can be used for patent litigation. For trademark litigation, fields such as CONFUSE can be used to define documents that evidence actual confusion. For copyright litigation, a field named ACCESS can be used to identify documents which evidence an alleged infringer's access to a copyright holder's material.

Once a litigation support system is configured with the computer system hardware, software, and relational database as described above, the system is ready for coding production documents.

Before any document is entered into the litigation support system, some initial decisions should be made. Specifically, a decision must be made as to whether to place a bar code or other indicia means on every page of a produced document or to place a bar code or other indicia means on only the first page of every document. Although the litigation support system allows for either alternative, in the preferred embodiment bar codes are placed at every page. By placing a bar code on every page, the bar codes can be designed to correspond to each production number thereby significantly simplifying both the document coding as well as the overall operation of the litigation support system.

Any of the available types of bar codes may be used for the litigation support system. Generally, there are ten different commercial bar code formats: Code 39, Full ASCII, Interleaved 2 of 5, UPC-E, UPC-A (with or without supplements), EAN-8, EAN-13, Codebar, MSI/Plessey and Code 128. The code used in the preferred embodiment is Code 39 since it allows the use of up to 40 alphanumeric characters per entry. Any commercial bar coding software program can be used to generate bar code labels for placement on production documents. Code 39 is preferred for generating bar code authority lists for field inputs as described below.

After the bar code labels have been generated and placed on the documents, the next step is to generate bar code authority lists for known input candidates. Generally, each record field of a database has a finite number of choices of information ("candidates") which lends itself to the use of authority lists.

Figure 3A:
Figure 3A:
Figure 3A:
Figure 3A:
Figure 3A:
Figure 3A:
Figure 3A:
Figure 3A:
Figure 3A:
Figure 3A:
Figure 3A:
Figure 3A:
Figure 3A:
Figure 3A:
Figure 3A:
Figure 3A:
Figure 3A:

FIG. 3A is an example of an authority list for the DOC_TYPE field and includes two columns 32 and 33. Column 32 represents a listing of various documents types that might be encountered in a particular document collection. Generally, the types of document to be coded at a particular time or for an entire litigation can be anticipated and listed as shown in FIG. 3A. Column 33 represents the corresponding bar code for each document type listed in column 32. As discussed above, any commercial bar coding software program can generate a list similar to that shown in FIG. 3A. A suitable program is "Labelright" available from Worthington Data Solitions.

When encountering a prompt from the litigation support system to code the DOC_TYPE field, the system operator selects from list 32 the appropriate response and scans the corresponding bar code from column 33. The optical scanning means then automatically converts the signal generated by scanning the bar code into a signal equivalent to that generated by a keyboard and forwards same to the computer system. As a result, coding of the DOC_TYPE field is consistently and accurately performed.

FIG. 3B is a multiple field authority list for NAME and NAME_FIRM candidates that appear on a group of documents. A multiple field authority list is similar to a single field authority list in that it is comprised of two columns, a list of input candidates 35 and corresponding bar codes 37. Here though, column 35 represents two fields, specifically, a list of NAME field candidates combined with a list of associated NAME_FIRM field candidates. Column 37 represents the corresponding bar code equivalent of the names and firms listed in column 35. A multiple field authority list, such as the NAME and NAME_FIRM list of FIG. 3B, can be designed to input data into several fields simultaneously. For example, Code 39 can generate 40 characters of bar code. By selecting field lengths for the NAME and NAME_FIRM fields of 30 and 10 characters respectively, a single scan with a hand held light pen or wand inputs both NAME and NAME_FIRM data into their related fields simultaneously from a single Code 39 bar code.

The NAME and NAME_FIRM multiple field authority list preferably includes a person's last name, first initial, and the company with which the individual is associated. For example, if Albert Einstein worked for XYZ Associates his entry would be "EINSTEIN A-XYZ ASSOC". This particular multiple data field format for NAME and NAME_FIRM permits unique identification of an individual for selective name or company searching.

The multiple field authority list can be used for inputting several fields of any type and is not restricted to the NAME and NAME_FIRM fields which are associated with the People database shown in Table 2. Moreover, more than two fields can be inputted in a single scan of a bar code. Multiple field entry can be designed by field length selection as described above. Alternatively, a return character for the data input can be embedded in the bar code. For example, dBase III Plus ™ responds to a semicolon character as a return. Thus, embedding a semicolon between fields will cause data entry to occur in the appropriate fields.

The resulting authority lists usually are printed out on paper or other substrate means to be used for scanning by a light pen or light wand. When a light pen is used a clear plastic sheet is placed on top of the paper or other substrate means to prevent the repeated use of the light pen from wearing away the authority list's bar codes.

Figure 4:
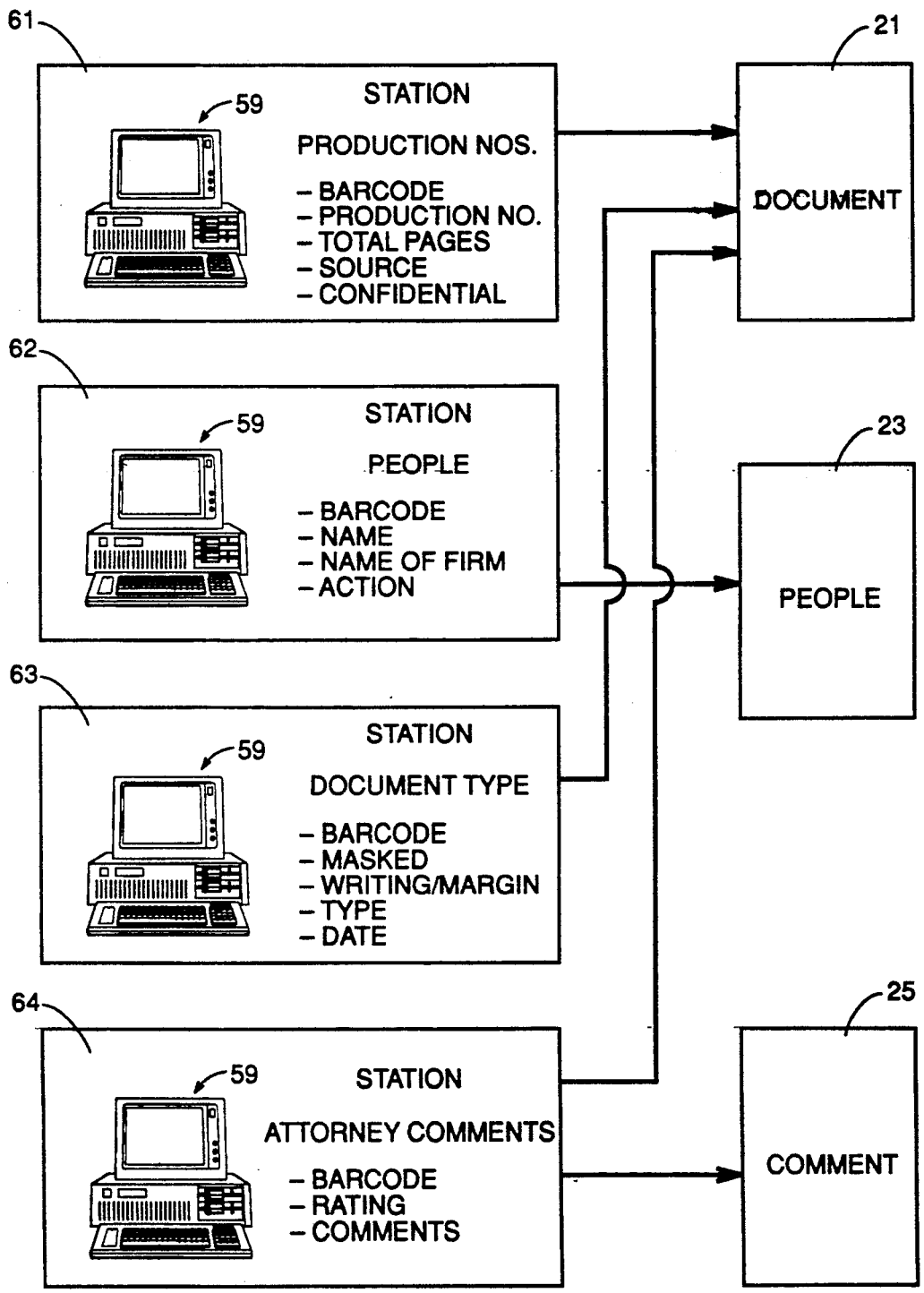
FIG. 4 shows a schematic diagram of various sub-system input stations used to code mass volumes of production documents and the particular topical databases of FIG. 2 those stations update.

In the preferred embodiment, once the bar coding and authority lists have been created, sub-system input "coding" stations are established to simplify the coding of mass volumes of documents. Preferably, these input stations are designed to maximize the flow rate of document coding. Although document coding can be performed at one station, it is more efficient, and therefore preferred, to use several sub-system input stations, each designed to input a particular group of fields. FIG. 4 shows a schematic diagram of the preferred embodiment of four sub-system input stations and their associated tasks.

The computer systems 59 used for the sub-system input stations do not have to be of the same class as that used to store and operate an entire litigation support system. Since the four input stations only perform the task of recording a small amount of bibliographic information per document for small groups of documents, such input stations can operate on lower cost 8-bit microprocessor computer systems. An example of such an input station computer system might be an IBM PC XT or compatible. Additionally, each input station is configured with a optical scanning means interfaced with a keyboard as discussed above and shown in FIG. 1. Using low cost computer systems for input stations significantly reduces the cost associated with setting up numerous input stations to code mass volumes of documents.

Referring to FIG. 4, Station 61 is used first to code document production numbers. The system operator at Station 61 scans the bar code number on a document with a light pen or wand, the signal generated being automatically converted and entered into the BAR_CODE field. Next, if the document's bar code is not the same as the document's beginning production number, the document's beginning production number and ending production number are manually entered through a keyboard. The system operator then determines the source of the document and whether it was designated confidential or non-confidential. The operator then scans the appropriate source from the bar code SOURCE AUTHORITY LIST for entry into the SOURCE field while the appropriate confidentiality status for the CONFID field is entered manually or scanned.

In certain situations the coding of record input fields can be more effectively handled automatically by computer generation. For example, if an entire set of documents are from a single source, or if an entire set of documents are confidential, the coding of the SOURCE or CONFID fields at Station 61 can be automated by modifying the station's program. Generally, the program would be modified to automatically enter into the SOURCE or CONFID fields the appropriate response, e.g. "Y" for the CONFID field. Automating field entries in the appropriate circumstances eliminates manual steps and reduces the overall time and costs associated with coding documents.

The document coded at Station 61 is then passed to the system operator at the second Station 62 who codes information relating to the people identified with relation to the document. First, the bar code is scanned. Next, the name of the author, addressee or copy recipient and his associated company is determined and scanned from the bar code NAME, NAME_FIRM authority list, see FIG. 3B. Then the Action of the person respective to the document, i.e., whether the person named is an author, addressee or copy recipient, is determined and scanned from the bar code ACTION authority list. The process is repeated for each person identified on the document. Thus, using this method a user can generate more than one record from a single document in the People database all linked by the document's bar code number.

The document coded at Station 62 is then passed to the third Station 63 where document-type information is recorded. First, the bar code is scanned into the system. Then a determination is made whether the document has been masked and whether any writing in the margin has occurred. The operator then scans the appropriate response from the bar code MASKED and IN_MARGIN authority lists. Then the document's type, e.g., Affidavit, Article, Handwritten Note, Memo or Minutes, is scanned from the bar code DOCUMENT_TYPE authority list, see FIG. 3A. Finally, the date of the document is manually entered via a keyboard.

The document is then passed to the fourth Station 64 where, after the bar code is scanned, the document's rating and associated attorney comments are entered. Here, the document is rated on a scale of 0 to 3, 0 being of least importance and 3 being of highest importance. Any additional comments are manually entered or scanned for future review and use.

For convenience of data manipulation and customization, temporary databases are created for each sub-system input station having only the required fields. These temporary databases may be created with commercially available database software, such as dBase III Plus TM or dBase IV TM by Ashton-Tate, Inc. of Torrance, Calif., which have data file structures compatible with Clipper TM compiled programs. Upon completion of document coding, these four sub-databases are then merged and updated into the Document database 21, the People database 23, and the Comment database 25, as shown in FIG. 4. Specifically, all the fields of the temporary databases of Stations 61 and 63 as well as the RATING field from Station 64 update the Document database 21. The BAR_CODE and COMMENT fields from Station 64 update the Comment database 25 while all of the fields of Station 62 update the People database 23. Updates can be performed using the Update commands of dBase III Plus TM or dBase IV TM with linking based on the BAR_CODE field.

The use of separate coding stations and temporary databases allows for more efficient and rapid coding of mass volumes of documents. While the above description indicates that documents with affixed bar codes flow sequentially through Stations 61 to 64, it will be appreciated that the station order is arbitrary. Thus, the order may be sequential, 61 to 64, reversed, 64 to 61, or random. It will also be appreciated that the number of computer systems used at each station may vary. For example, Stations 61, 62 and 64 may only require a single operator per station using a single computer system per station whereas Station 63 may comprise multiple operators using a like number of computer systems coding different document types.

Once the separate coding stations update the relational databases, a system operator can view, edit and append records to the database through a record display screen as shown in FIG. 5. The record display screen is divided into three general areas. The first area 71 displays the contents of each field in the Document database 21. Area 73 displays the contents of each field in the Deposition Exhibit database 27 as well as the contents of each field of the Deposition Witness database 29. Finally, the third area 75 displays the contents of each field in the Trial database 31. Above area 71, the system displays the present record number as well as the current date. Below areas 73 and 75 the system displays a command line for editing and selecting records.

Once document coding has been completed and all of the line bibliographic document information has been entered into the system's relational databases, deposition exhibits and witnesses can now be entered as they arise during the course of litigation. Here, a system operator only needs to code the deposition exhibit number, witness name and action to complete each entry.

To code a deposition exhibit, the system operator first proceeds to determine if the exhibit is coded in the document database by performing a FIND using the BAR_CODE index. The operator scans the bar code on the exhibit and the program finds the document. If no document is found, the document information would be coded into the Document datebase 21. If the document is found, the user proceeds to enter the Deposition Exhibit information. The operators selects from a main system screen the Deposition Exhibit database 29. The system operator then selects the Append mode of the litigation support system to add an exhibit to the Deposition Exhibit database 29. The litigation support system then displays a screen similar to that shown in FIG. 5. While in the Deposition Exhibit database, the user is directed to enter information in area 73 and is "locked out" of the areas 71 and 75. The system operator then scans the bar code from the deposition exhibit into the BAR_CODE field and then manually enters the Deposition Exhibit number in to the DEPO_EXH field.

After adding the exhibit to the Deposition Exhibit database 27, the system operator then selects the Deposition Witness database 29 and the Append mode to add the witness information. The system operator is again prompted with a record display screen similar to that shown in FIG. 5. Here, the operator scans the bar code, the witness name and the action, i.e., whether the exhibit was marked, asked or authenticated, into their related fields. Once the system operator enters this information to the Deposition Witness database coding of the deposition exhibit is completed. The litigation support system then automatically links the deposition exhibit information to the other databases through the bar code 19 as shown in FIG. 2.

Additionally, trial exhibits can be entered in the same manner. The trial exhibit number, objection if any, proposed witness to be used, and information regarding whether the exhibit has been offered or admitted is coded for each trial exhibit in area 75 in a manner similar to the coding of deposition exhibits. Trial exhibit list information is used during discovery, pretrial, and trial phases to build the proposed trial exhibits, prepare trial exhibit lists, to generate witness exhibits and track the status of exhibits at trial and to prepare the final trial exhibit list record.

FIG. 5 shows a record display screen for a document which has been coded, used as a deposition exhibit, and used as a trial exhibit. A review of area 71 informs the operator that the specific document was a memorandum from R. Frost to L. Hand concerning lab results, was produced from ABC Company to XYZ Associates and had C. DeMile as a copy recipient. The document rating is a 3, indicating that the document is highly important, and the COMMENT field indicates that the document concerns bioassay results. Additionally, a review of area 73 indicates the document was marked as Deposition Exhibit No. 32 during Mr. DeMile's deposition. A review of area 75 indicates the document was again used as Trial Exhibit 101 during Mr. DeMile's testimony, an objection was made stating that the document was illegible and hearsay under Federal Rules of Evidence 802, and the document was offered and received into evidence on Jan. 3.

A completed database will allow a user to do numerous types of informative searches for valuable information and generate related reports. For example, in preparing for Mr. DeMile's deposition, a system operator can identify every document considered highly important, i.e. where the rating equals 3, that Mr. DeMile authored, received or was a copy recipient. The resulting search would then be generated as a report for the deposing attorney to review in preparation for Mr. DeMile's deposition. Similarly, if an attorney has a particularly valuable document that he is prepared to use at trial, he can interrogate the system to find out what witnesses have given deposition testimony concerning that very document. As can be seen, numerous types of informative searches can be structured to suit a particular inquiry of the system yielding valuable and accurate document information.

Reports may be generated using commercially available report writer programs to extract the data. Suitable programs include the report writers available in dBase III Plus TM or dBase IV and R&R Relational Report Writer TM available from Concentric Data Systems, Inc. of Westboro, Mass. Similarly, labels may be produced from the database using label generators provided in dBase III Plus TM or dBbase IV TM.

As is readily apparent to those skilled in the art, the improved litigation support system can be used by anyone involved in a law suit. Specifically, courts can adopt the system for recording information filed in pending litigations. By requiring by local rule or other means that all court papers filed include a bar code or other indicia means, the court clerk can optically scan each filing for automatic updating of litigation dockets. Additionally, exhibits introduced at trial, trial transcripts, and affidavits filed can be recorded and used to maintain a trial record.

It will thus be seen that the objects set forth above, among those made apparent from the preceding description, are effectively obtained. Since certain changes may be made above system and method without departing from the scope of the invention, it is intended that all matter contained in the above description and shown in the accompany drawing shall be interpretive as illustrative and not limiting. It is also understood that the following claims are intended to cover all of the generic and specific features of the invention described herein, and all statements of the scope of the invention which, as a matter of a language might be said to fall between.

INDEX TO APPENDIX

| APPENDIX NO. | PROGRAM NAME | DESCRIPTION |
|---|---|---|
| 1. | DOCUMENT PRG | - MAIN program for DOCUMENT.DBF |
| 2. | DOC_ADIS PRG | - DISPLAY program for DOCUMENT.DBF |
| 3. | DOC_APAC PRG | - PACK program for DOCUMENT.DBF |
| 4. | DOC_APHR PRG | - PHRASE program for DOCUMENT.DBF |
| 5. | DOC_APPE PRG | - APPEND program for DOCUMENT.DBF |
| 6. | DOC_BDIS PRG | - DISPLAY program for DOCUMENT.DBF |
| 7. | DOC_BPHR PRG | - PHRASE program for DOCUMENT.DBF |
| 8. | DOC_BROW PRG | - BROWSE program for DOCUMENT.DBF |
| 9. | DOC_CDIS PRG | - DISPLAY program for DOCUMENT.DBF |
| 10. | DOC_COND PRG | - CONDITION program for DOCUMENT.DBF |
| 11. | DOC_CPHR PRG | - PHRASE program for DOCUMENT.DBF |
| 12. | DOC_DDIS PRG | - DISPLAY program for DOCUMENT.DBF |
| 13. | DOC_DPHR PRG | - PHRASE program for DOCUMENT.DBF |
| 14. | DOC_EDIS PRG | - DISPLAY program for DOCUMENT.DBF |
| 15. | DOC_EDIT PRG | - EDIT program for DOCUMENT.DBF |
| 16. | DOC_EPHR PRG | - PHRASE program for DOCUMENT.DBF |
| 17. | DOC_EXPR PRG | - EXPRESSION program for DOCUMENT.DBF |
| 18. | DOC_FDIS PRG | - DISPLAY program for DOCUMENT.DBF |
| 19. | DOC_FPHR PRG | - PHRASE program for DOCUMENT.DBF |
| 20. | DOC_HELP PRG | - HELP program for DOCUMENT.DBF |
| 21. | DOC_LABE PRG | - LABEL program for DOCUMENT.DBF |
| 22. | DOC_MENU PRG | - MENU program for DOCUMENT.DBF |
| 23. | DOC_OPEN PRG | - OPEN program for DOCUMENT.DBF |
| 24. | DOC_PACK PRG | - PACK driver program for DOCUMENT.DBF |
| 25. | DOC_PRO1 PRG | - PROCEDURE file for DOCUMENT.DBF |
| 26. | DOC_PRO2 PRG | - Second PROCEDURE file for DOCUMENT.DBF |
| 27. | DOC_REPO PRG | - REPORT program for DOCUMENT.DBF |

APPENDIX 1

```
* Program.: DOCUMENT.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: MAIN program for DOCUMENT.DBF
*
* ---SET environment.
SET TALK OFF
SET BELL OFF
SET MENUS OFF
SET SAFETY OFF
SET ESCAPE OFF
SET SCOREBOARD OFF
SET WRAP ON        && Allow wrap-around on light-bar menus.
READEXIT(.T.)      && Allow Uparrow/Dnarrow to exit READs.
* ---Open PROCEDURE file.
SET PROCEDURE TO DOC_PRO1
SET PROCEDURE TO DOC_PRO2
DO HELLO
WAIT
*
* ---Declare Global memory variables.
PUBLIC Clipper
PRIVATE;
   HOME,ENDkey,PgDn,PgUp,Returnkey,DelRecord,Esc,;
   UParrow,DOWNarrow,LEFTarrow,RIGHTarrow,;
   ScreenAtr,StatusAtr,WindowAtr,PromptAtr,HiliteAtr
PRIVATE;
BFname,DBFtemp,dbfarea,dbfpagemin,dbfpagemax,NdxOrder,NdxTotal,;
   PromptBar,PromptRow,mainchoice,menuchoice,choice,isedited,;
   LastRec,recnum,oldrecnum,expr,IsValid
PRIVATE NDXnam1,NDXkey1
PRIVATE NDXnam2,NDXkey2
PRIVATE NDXnam3,NDXkey3
* ---Declare field memvars.
PRIVATE;
   mBar_code,mProd_no,mProd_noen,mSource,mMasked,;
   mIn_margin,mDoc_type,mDoc_date,mTotal_pag,mRating,;
   mDuplicate,mConfid,mDescript,mTag,mKey_word,;
   mPrior_art,mFlag_1,mFlag_2,mFlag_3,mFlag_4
PRIVATE;
   mFlag_5,mProducedt,mImmunity,mBAR_CODE,mACTION,;
   mNAME,mNAME_FIRM,mBAR_CODE,mCOMMENT,mPROD_NO,;
   mDEPO_EXH,mBAR_CODE,mBAR_CODE,mACTION,mWITNESS,;
   mBAR_CODE,mTRIAL_EXH,mWITNESS,mOBJECTION,mOFFER_ADM
*
* ---Initialize Global memory variables and OPEN file(s).
* ---Select (dbfarea) the first available database file.
dbfarea = "1"
DO DOC_OPEN
*
* ---Start with Edit/View.
mainchoice = "E"
* ---Execute main loop.
DO WHILE .T.
   * ---Display main menu and get choice.

DO DOC_MENU WITH mainchoice
   SET COLOR TO &WindowAtr
   DO CASE
   CASE mainchoice $ "Q"+Returnkey
      EXIT
   CASE .NOT. (mainchoice $ "AHS") .AND. (LastRec = 0)
```

```
      @ 17, 0 SAY "EMPTY DATABASE:  Only Append, Help, and Select are
      available."
      WAIT
   CASE mainchoice = "A"
      * ---DO APPEND.
      DO DOC_APPE
   CASE mainchoice = "B"
      * ---BROWSE the database file.
      DO DOC_BROW
      * ---Flush all active buffers to disk.
      COMMIT
   CASE mainchoice = "E"
      * ---DO EDIT/VIEW.
      isedited = .F.
      DO DOC_EDIT WITH isedited
   CASE mainchoice = "H"
      * ---DO HELP.
      DO DOC_HELP
   CASE mainchoice = "L"
      * ---DO LABELS.
      DO DOC_LABE
   CASE mainchoice = "P"
      * ---DO PACK.
      DO DOC_PACK WITH 18
   CASE mainchoice = "R"
      * ---DO REPORT.
      DO DOC_REPO
   CASE mainchoice = "S"
      * ---DO SELECT FILE.
      DO DOC_FILE WITH 18,choice
   CASE mainchoice = "K"
      * ---- do set keys
      DO SETKEYS

CASE MAINCHOICE = "I"
      * ---- DO REINDEX
      REINDEX

ENDCASE
ENDDO
*
* ---Closing operations.

SET COLOR TO &ScreenAtr
CLEAR

DO HELLO

RELEASE Clipper
CLOSE DATABASE
CLOSE INDEX
CLOSE PROCEDURE
SET WRAP OFF
SET SCOREBOARD ON
SET ESCAPE ON
SET SAFETY ON
SET MENUS ON
SET BELL ON
SET TALK ON
RETURN
* EOF: DOCUMENT.PRG
```

APPENDIX 2

```
* Program.: DOC_ADIS.PRG
* Author..: WILLIAM S. FEILER
```

```
* Date....: 04/01/90
* Notice..: Copyright © 1990, WILLIAM S. FEILER, All Rights Reserved
* Version.: Clipper, Summer 1987
* Notes...: DISPLAY program for DOCUMENT.DBF
*
PARAMETER row,listRECS
IF listRECS > 1
   * ---Display heading when listing the entire page.
   SET COLOR TO &StatusAtr
   @ rowTOP-1,0
   @ rowTOP-1,0 SAY "Record#  "
   DO CASE
   CASE pancol = 1
      ?? "BAR_CODE------- PROD_NO-------- PROD_NOEND----- SOURCE---- MASKED"
   CASE pancol = 2
      ?? "IN_MARGIN DOC_TYPE------- DOC_DATE TOTAL_PAGE RATING"
   CASE pancol = 3
      ?? "DUPLICATES--------------- CONFID"
   CASE pancol = 4
      ?? "DESCRIPT------------------------------------- TAG"
   CASE pancol = 5
      ?? "KEY_WORD------------------------------------- PRIOR_ART
FLAG_1"
   CASE pancol = 6
      ?? "FLAG_2 FLAG_3 FLAG_4 FLAG_5 PRODUCEDTO----- IMMUNITY--"
   ENDCASE
   * ---Clear the window area.
   SET COLOR TO &WindowAtr
   @ rowTOP,0 CLEAR TO rowBOTTOM,79
ENDIF
* ---Display the records.
SET HEADING OFF
SET COLOR TO &WindowAtr
@ row-1,0 SAY ""
DO CASE
CASE pancol = 1
   LIST NEXT listRECS Bar_code,Prod_no,Prod_noend,Source,Masked,"      "
CASE pancol = 2
   LIST NEXT listRECS In_margin,"        ",Doc_type,Doc_date,Total_page,
   "     ",Rating,"    "
CASE pancol = 3
   LIST NEXT listRECS Duplicates,Confid,"     "
CASE pancol = 4
   LIST NEXT listRECS Descript,Tag,""
CASE pancol = 5
   LIST NEXT listRECS Key_word,Prior_art,"       ",Flag_1,""
CASE pancol = 6
   LIST NEXT listRECS
Flag_2,"",Flag_3,"",Flag_4,"",Flag_5,"",Producedto,Immunity
ENDCASE
SET HEADING ON
RETURN
* EOF: DOC_ADIS.PRG
```

APPENDIX 3

```
* Program.: DOC_APAC.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: PACK program for DOCUMENT.DBF
*
PARAMETER row,origFILE,tempFILE,origINDEX,IsFileOK
PRIVATE origMEMO,tempMEMO,undelrecs
*
* ---Build MEMO filenames.
```

```
origMEMO = TRIM( SUBSTR( origFILE,1,AT(".",origFILE)-1 ) ) + ".DBT"
tempMEMO = TRIM( SUBSTR( tempFILE,1,AT(".",tempFILE)-1 ) ) + ".DBT"
*
* ---Delete old temporary file if it exists.
IF FILE( tempFILE )
   DELETE FILE &tempFILE
   IF FILE( tempMEMO )
      DELETE FILE &tempMEMO
   ENDIF
ENDIF
*
* ---Open original file and "PACK".
USE &origFILE
IF "" <> TRIM(origINDEX)
   SET INDEX TO &origINDEX
ENDIF
@ row,0 CLEAR
@ row,0 SAY [Copying "] + origFILE + ["...]
* ---Copy undeleted records in order of index.
* ---The new database will be "SORTed" in index order.
SET DELETED ON
SET TALK ON
COPY TO &tempFILE
SET TALK OFF
SET DELETED OFF
* ---Turn off the index and count the number of undeleted records.
SET INDEX TO
COUNT FOR .NOT. DELETED() TO undelrecs
* ---Close original file.
USE
*
* ---Was COPY TO temporary file successful?
IsFileOK = .F.
IF FILE( tempFILE )
   USE &tempFILE
   * ---The undeleted records in both files must match.
   IF EOF()
      IsFileOK = (undelrecs = 0)
   ELSE
      GOTO BOTTOM
      IsFileOK = (undelrecs = RECNO())
   ENDIF
   USE
ENDIF
IF .NOT. IsFileOK
   * ---"tempFILE" was not created or has an incorrect record count.
   @ row,0 CLEAR
   @ row,0 SAY "The file could not be packed."
   WAIT
   * ---Delete original index and have calling program recreate it.
   DELETE FILE &origINDEX
   RETURN
ENDIF
*
* ---Delete the original file, and
* ---RENAME temporary to original.
DELETE FILE &origFILE
RENAME &tempFILE TO &origFILE
IF FILE( origMEMO )
   DELETE FILE &origMEMO
   RENAME &tempMEMO TO &origMEMO
ENDIF
RETURN
* EOF: DOC_APAC.PRG
```

APPENDIX 4

```
* Program.: DOC_APHR.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: PHRASE program for DOCUMENT.DBF
*
PARAMETER firstrow,fldnum,phrase
PRIVATE row,col,oper,opernum,operMAX
PRIVATE fldnam,fldtyp,fldwid,flddec,fldget
row = firstrow
opernum = 0
*
* ---Get field information:  fldnam,fldtyp,fldwid,flddec
IF fldnum <= 15
   fldnam = SUBSTR(;
   "Bar_code  Prod_no   Prod_noendSource    Masked    "+;
   "In_margin Doc_type  Doc_date  Total_pageRating    "+;
   "DuplicatesConfid    Descript  Tag       Key_word  ",;
   fldnum*10-9,10 )
ELSE
   fldnam = SUBSTR(;
   "Prior_art Flag_1    Flag_2    Flag_3    Flag_4    "+;
   "Flag_5    ProducedtoImmunity  ",;
   (fldnum-15)*10-9,10 )
ENDIF
@ row+1,0
SET COLOR TO &HiliteAtr
@ row+1,0 SAY fldnam
fldnam = TRIM( fldnam )
fldtyp = SUBSTR( "CCCCCCCCCCCCCCCCCCCCCCCCC",fldnum,1 )
fldwid = VAL( SUBSTR(;
   " 15 15 15 10  1  1 15  8  4  1 26  1 50  2 50"+;
   "  2  5  5  5  5  5 15 10",;
   fldnum*3-2,3 ) )
DO CASE
CASE fldtyp = "C"
   fldget = SPACE( fldwid )
CASE fldtyp = "D"
   fldget = CTOD( "  /  /  " )
CASE fldtyp = "N"
   fldget = 0.00
   flddec = VAL( SUBSTR(;
   " 0 0 0 0 0 0 0 0 0 0 0 0 0 0 0"+;
   " 0 0 0 0 0 0 0 0",;
   fldnum*2-1,2 ) )
CASE fldtyp = "M"
   fldget = SPACE( 65 )
   opernum = 8
OTHERWISE
   fldget = .T.
   opernum = 1
ENDCASE
*
* ---Get OPERATOR.
SET COLOR TO &WindowAtr
IF opernum = 0
   opernum = 1
   operMAX = VAL( SUBSTR( "8661",AT( fldtyp,"CDNL" ),1 ) )
   @ row,0
   @ row,0 SAY "Enter OPERATOR #" GET opernum PICTURE "99" RANGE 1,operMAX
   READ
   IF opernum = 8
      fldget = SPACE( 65 )
   ENDIF
```

```
ENDIF
oper = TRIM( SUBSTR( " = < > >=< <=$ $ ",opernum*2,2 ) )
SET COLOR TO &HiliteAtr
@ row+1,12 SAY oper
*
* ---Get field VALUE.
SET COLOR TO &WindowAtr
@ row,0
@ row,0 SAY "Enter VALUE to compare"
row = row + 1
col = 15
DO CASE
CASE fldnum < 5
   @ row,col GET fldget
CASE fldnum = 5
   @ row,col GET fldget PICTURE "L"
CASE fldnum = 6
   @ row,col GET fldget PICTURE "L"
CASE fldnum < 8
   @ row,col GET fldget
CASE fldnum = 8
   @ row,col GET fldget PICTURE "99/99/99"
CASE fldnum = 9
   @ row,col GET fldget PICTURE "9999"
CASE fldnum = 10
   @ row,col GET fldget PICTURE "9"
CASE fldnum < 12
   @ row,col GET fldget
CASE fldnum = 12
   @ row,col GET fldget PICTURE "L"
CASE fldnum < 23
   @ row,col GET fldget
CASE fldnum = 23
   @ row,col GET fldget PICTURE "@!"
ENDCASE
READ
*
* ---Build phrase.
DO CASE
CASE fldtyp = "M"
   phrase = ["]+TRIM(fldget)+["] + oper + fldnam
CASE (fldtyp = "C") .OR. (opernum = 7)
   IF opernum = 7
      phrase = ["]+UPPER(TRIM(fldget))+["] + oper + "UPPER("+fldnam+")"
   ELSE
      phrase = "UPPER("+fldnam+")" + oper + ["]+UPPER(TRIM(fldget))+["]
   ENDIF
CASE fldtyp = "N"
   phrase = fldnam + oper + LTRIM( STR( fldget,fldwid,flddec ) )
CASE fldtyp = "D"
   IF DTOC(fldget) = "  /  /  "
      phrase = [DTOC(] + fldnam + [)] + oper + ["  /  /  "]
   ELSE
      phrase = fldnam + oper + [CTOD("] + DTOC(fldget) + [")]
   ENDIF
CASE fldget
   phrase = fldnam
OTHERWISE
   phrase = ".NOT." + fldnam
ENDCASE
phrase = "(" + phrase + ")"
RETURN
* EOF: DOC_APHR.PRG
```

APPENDIX 5

```
* Program.: DOC_APPE.PRG
* Author..: WILLIAM S. FEILER
```

```
* Date....: 04/01/90
* Notice..: Copyright © 1990, WILLIAM S. FEILER, All Rights Reserved
* Version.: Clipper, Summer 1987
* Notes...: APPEND program for DOCUMENT.DBF
*
PRIVATE row,recnum,recnumOFS
PRIVATE IsBlank,IsUnique,IsCarry,IsDeleted
*
* ---Switch to MASTER index.
IF NdxOrder > "0"
   NdxOrder = "1"
   SET ORDER TO &NdxOrder
ENDIF
* ---Initialize local memory variables.
row = PromptRow
recnumOFS = 0
STORE .F. TO IsBlank,IsUnique,IsCarry,IsDeleted
expr = ""
DO DOC_FORM
* ---Start by adding one record.
choice = Returnkey
* ---The following loop is really a "REPEAT/UNTIL <cond>".
DO WHILE .T.
   IF (choice = Returnkey) .OR. IsCarry
      * ---Add another record.
      recnumOFS = recnumOFS + 1
      IF .NOT. IsCarry
         * ---Initialize memory variables with blanks.
         GOTO BOTTOM
         IF .NOT. EOF()
            SKIP
         ENDIF
         DO DOC_SAYS
         DO DOC_STOR
         GOTO BOTTOM
         DO DOC_INIT
      ENDIF
      IsCarry = .F.
   ENDIF
   DO StatLine WITH LastRec+recnumOFS,IsDeleted
   @ 0,50 SAY "*BLANK*   "
   * ---Check for duplicate record.
   DO WHILE .T.
      DO SayLine WITH row,"Press {Ctrl-W} to Exit"
      * ---Enter key field values.
      DO DOC_KEYS WITH expr,IsBlank,IsUnique
      IF IsBlank .OR. .NOT. IsUnique
         EXIT
      ENDIF
      * ---Check for duplicate key in master file.
      SEEK expr
      IF EOF()
         * ---No duplicate key found, so leave.
         EXIT
      ELSE
         * ---Found a duplicate record in the file.
         SET COLOR TO &StatusAtr
         @ 0,50 SAY "*DELETED*"
         DO SayLine WITH row,;
            "DUPLICATE KEY encountered.  Record cannot be appended."
         WAIT
      ENDIF
   ENDDO
IF IsBlank
   IsDeleted = .T.
ELSE
   DO DOC_GETS
```

```
        ENDIF
        DO StatLine WITH LastRec+recnumOFS,IsDeleted
        * ---Loop until Add, Carry, Edit, or Finished is selected.
        * ---The following loop is really a "REPEAT/UNTIL <cond>".
        menuchoice = 4
        DO WHILE .T.
            * ---You can add other prompts and options in this inner loop.
            * ---For example, to add an invoicing routine:
            *
            *      (1) Insert "{I}nvoice" in the prompt line below,
            *      (2) Include "I" in the values for GetKey, and
            *      (3) Add a CASE to the DO CASE structure, such as:
            *
            *          CASE choice = "I"
            *              DO <invoice_program_name>
            *
            SET COLOR TO &PromptAtr
            @ row,0 CLEAR
            @ row, 0 SAY "APPEND:"
            @ row,10 PROMPT "Add-another"
            @ row,24 PROMPT "Carry-add"
            @ row,36 PROMPT "Edit"
            @ row,43 PROMPT "Finished"
            @ row,54 PROMPT "Delete"
            MENU TO menuchoice
            choice =SUBSTR( "F"+Returnkey+"CEF"+DelRecord,menuchoice + 1,1 )
            DO CASE
            CASE choice = DelRecord
                * ---Toggle IsDeleted flag.
                IsDeleted = .NOT. IsDeleted
                DO StatLine WITH LastRec+recnumOFS,IsDeleted
            CASE choice = "E"
                * ---Re-edit the record.
                IsDeleted = .F.
            CASE choice $ "CF"+Returnkey
                * ---Finished, Add-another, or Carry-add.
                IsCarry = (choice = "C")
                IF IsDeleted
                    * ---Reset offset so as not to increment.
                    recnumOFS = recnumOFS - 1
                ELSE
                    * ---Save the memvar values.
                    APPEND BLANK
                    DO DOC_REPL
                ENDIF
            ENDCASE
            * ---Condition to exit inner loop.
            IF choice $ "CEF"+Returnkey
                EXIT
            ENDIF
        ENDDO
        * ---Condition to exit outer loop.
        IF choice = "F"
            EXIT
        ENDIF
ENDDO
LastRec = LastRec + recnumOFS
GOTO TOP
RETURN
* EOF: DOC_APPE.PRG
```

APPENDIX 6

```
* Program.: DOC_BDIS.PRG
* Author..: WILLIAM S. FEILER
* Date....: 04/01/90
```

* Notice..: Copyright © 1990, WILLIAM S. FEILER, All Rights Reserved
* Version.: Clipper, Summer 1987
* Notes...: DISPLAY program for DOCUMENT.DBF
*
```
PARAMETER row,listRECS
IF listRECS > 1
   * ---Display heading when listing the entire page.
   SET COLOR TO &StatusAtr
   @ rowTOP-1,0
   @ rowTOP-1,0 SAY "Record# "
   DO CASE
   CASE pancol = 1
      ?? "BAR_CODE------- ACTION NAME-------------------------- NAME_FIRM-"
   ENDCASE
   * ---Clear the window area.
   SET COLOR TO &WindowAtr
   @ rowTOP,0 CLEAR TO rowBOTTOM,79
ENDIF
* ---Display the records.
SET HEADING OFF
SET COLOR TO &WindowAtr
@ row-1,0 SAY ""
DO CASE
CASE pancol = 1
   LIST NEXT listRECS BAR_CODE,ACTION," ",NAME,NAME_FIRM
ENDCASE
SET HEADING ON.
RETURN
* EOF: DOC_BDIS.PRG
```

APPENDIX 7

* Program.: DOC_BPHR.PRG
* Author..: WILLIAM S. FEILER
* Date....: 04/01/90
* Notice..: Copyright © 1990, WILLIAM S. FEILER, All Rights *Reserved
* Version.: Clipper, Summer 1987
* Notes...: PHRASE program for DOCUMENT.DBF
*
```
PARAMETER firstrow,fldnum,phrase
PRIVATE row,col,oper,opernum,operMAX
PRIVATE fldnam,fldtyp,fldwid,flddec,fldget
row = firstrow
opernum = 0
*
* ---Get field information: fldnam,fldtyp,fldwid,flddec
fldnam = SUBSTR(;
   "BAR_CODE   ACTION    NAME      NAME_FIRM ",;
   fldnum*10-9,10 )
@ row+1,0
SET COLOR TO &HiliteAtr
@ row+1,0 SAY fldnam
fldnam = TRIM( fldnam )
fldtyp = SUBSTR( "CCCC",fldnum,1 )
fldwid = VAL( SUBSTR(;
   " 15  4 30 10",;
   fldnum*3-2,3 ) )
DO CASE
CASE fldtyp = "C"
   fldget = SPACE( fldwid )
CASE fldtyp = "D"
   fldget = CTOD( "  /  /  " )
CASE fldtyp = "N"
   fldget = 0.00
   flddec = VAL( SUBSTR(;
   " 0 0 0 0",;
```

```
       fldnum*2-1,2 ) )
CASE fldtyp = "M"
   fldget = SPACE( 65 )
   opernum = 8
OTHERWISE
   fldget = .T.
   opernum = 1
ENDCASE
*
* ---Get OPERATOR.
SET COLOR TO &WindowAtr
IF opernum = 0
   opernum = 1
   operMAX = VAL( SUBSTR( "8661",AT( fldtyp,"CDNL" ),1 ) )
   @ row,0
   @ row,0 SAY "Enter OPERATOR #" GET opernum PICTURE "99" RANGE 1,operMAX
   READ
   IF opernum = 8
      fldget = SPACE( 65 )
   ENDIF
ENDIF
oper = TRIM( SUBSTR( "  =  <  >  >=< <=$ $ ",opernum*2,2 ) )
SET COLOR TO &HiliteAtr
@ row+1,12 SAY oper
*
* ---Get field VALUE.
SET COLOR TO &WindowAtr
@ row,0
@ row,0 SAY "Enter VALUE to compare"
row = row + 1
col = 15
DO CASE
CASE fldnum < 2
   @ row,col GET fldget
CASE fldnum = 2
   @ row,col GET fldget
CASE fldnum <= 4
   @ row,col GET fldget
ENDCASE
READ
*
* ---Build phrase.
DO CASE
CASE fldtyp = "M"
   phrase = ["]+TRIM(fldget)+["] + oper + fldnam
CASE (fldtyp = "C") .OR. (opernum = 7)
   IF opernum = 7
      phrase = ["]+UPPER(TRIM(fldget))+["] + oper + "UPPER("+fldnam+")"
   ELSE
      phrase = "UPPER("+fldnam+")" + oper + ["]+UPPER(TRIM(fldget))+["]
   ENDIF
CASE fldtyp = "N"
   phrase = fldnam + oper + LTRIM( STR( fldget,fldwid,flddec ) )
CASE fldtyp = "D"
   IF DTOC(fldget) = "  /  /  "
      phrase = [DTOC(] + fldnam + [)] + oper + ["  /  /  "]
   ELSE
      phrase = fldnam + oper + [CTOD("] + DTOC(fldget) + [")]
   ENDIF
CASE fldget
   phrase = fldnam
OTHERWISE
   phrase = ".NOT." + fldnam
ENDCASE
phrase = "(" + phrase + ")"
RETURN
* EOF: DOC_BPHR.PRG
```

APPENDIX 8

```
* Program.: DOC_BROW.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: BROWSE program for DOCUMENT.DBF
*
PRIVATE pancol,panMAX,panLAST,recnumTOP,recnumLAST,skipRECS
PRIVATE row,rowTOP,rowBOTTOM,rowPROMPT,KEYSTROKES,PagePaint
PRIVATE isedited
PRIVATE filterSAVE
KEYSTROKES = "EFGL"+UParrow+DOWNarrow+HOME+LEFTarrow+;
             RIGHTarrow+ENDkey+PgDn+PgUp+DelRecord+Returnkey
rowTOP = 2
rowBOTTOM = 20
rowPROMPT = rowBOTTOM + 3
skipRECS = rowBOTTOM - rowTOP + 1
GOTO TOP
* ---Initialize local variables.
row = rowTOP
recnum = RECNO()
recnumTOP = recnum
PagePaint = .T.
isedited = .F.
filterSAVE = ""
pancol = 1
panLAST = 1
DO CASE
CASE dbfarea = "1"
   panMAX = 6
CASE dbfarea = "2"
   panMAX = 1
CASE dbfarea = "3"
   panMAX = 1
CASE dbfarea = "4"
   panMAX = 1
CASE dbfarea = "5"
   panMAX = 2
CASE dbfarea = "6"
   panMAX = 3
ENDCASE
* ---Perform BROWSE.
SET COLOR TO &ScreenAtr
CLEAR
* ---The following loop is really a "REPEAT/UNTIL <cond>".
DO WHILE .T.
   IF PagePaint
      recnum = RECNO()
      GOTO recnumTOP
      SET COLOR TO &HiliteAtr
      @ 0,0 SAY "C:" + DBFname
      DO CASE
      CASE dbfarea = "1"
         DO DOC_ADIS WITH (rowTOP),skipRECS
      CASE dbfarea = "2"
         DO DOC_BDIS WITH (rowTOP),skipRECS
      CASE dbfarea = "3"
         DO DOC_CDIS WITH (rowTOP),skipRECS
      CASE dbfarea = "4"
         DO DOC_DDIS WITH (rowTOP),skipRECS
      CASE dbfarea = "5"
         DO DOC_EDIS WITH (rowTOP),skipRECS
      CASE dbfarea = "6"
         DO DOC_FDIS WITH (rowTOP),skipRECS
```

```
      ENDCASE
      GOTO recnum
      IF pancol = panLAST
         * ---Reposition record pointer when repainting current page.
         row = rowTOP
      ENDIF
      panLAST = pancol
      PagePaint = .F.
ENDIF
SET COLOR TO &PromptAtr
@ rowPROMPT-1,0 SAY PromptBar
@ rowPROMPT,0 SAY ;
   "BROWSE:  (E)dit   (F)ind   (G)oto   fi(L)ter  <Arrows>  <Del>  <Return> "
SET COLOR TO &HiliteAtr
@ rowPROMPT, 9 SAY "(E)"
@ rowPROMPT,17 SAY "(F)"
@ rowPROMPT,25 SAY "(G)"
@ rowPROMPT,35 SAY "(L)"
@ rowPROMPT,44 SAY "Arrows"
@ rowPROMPT,54 SAY "Del"
@ rowPROMPT,61 SAY "Return"
SET COLOR TO &PromptAtr
@ row,0 SAY CHR(16)
DO GetKey WITH choice,KEYSTROKES
* ---Reposition record pointer.
DO WHILE choice $ UParrow+DOWNarrow
    @ row,0 SAY " "
    IF choice = UParrow
       SKIP -1
       DO CASE
       CASE BOF()
          GOTO TOP
       CASE row > rowTOP
          row = row - 1
       OTHERWISE
          recnumTOP = RECNO()
          * ---Scroll window down.
          SCROLL( rowTOP,0,rowBOTTOM,79,-1 )
          DO CASE
          CASE dbfarea = "1"
             DO DOC_ADIS WITH row,1
          CASE dbfarea = "2"
             DO DOC_BDIS WITH row,1
          CASE dbfarea = "3"
             DO DOC_CDIS WITH row,1
          CASE dbfarea = "4"
             DO DOC_DDIS WITH row,1
          CASE dbfarea = "5"
             DO DOC_EDIS WITH row,1
          CASE dbfarea = "6"
             DO DOC_FDIS WITH row,1
          ENDCASE
       ENDCASE
    ELSE
       SKIP
       DO CASE
       CASE EOF()
          GOTO BOTTOM
       CASE row < rowBOTTOM
          row = row + 1
       OTHERWISE
          * ---Adjust top-of-page record pointer.
          recnum = RECNO()
          GOTO recnumTOP
          SKIP
          recnumTOP = RECNO()
```

```
                GOTO recnum
                * ---Scroll window up.
                SCROLL( rowTOP,0,rowBOTTOM,79,1 )
                DO CASE
                CASE dbfarea = "1"
                    DO DOC_ADIS WITH row,1
                CASE dbfarea = "2"
                    DO DOC_BDIS WITH row,1
                CASE dbfarea = "3"
                    DO DOC_CDIS WITH row,1
                CASE dbfarea = "4"
                    DO DOC_DDIS WITH row,1
                CASE dbfarea = "5"
                    DO DOC_EDIS WITH row,1
                CASE dbfarea = "6"
                    DO DOC_FDIS WITH row,1
                ENDCASE
            ENDCASE
        ENDIF
        @ row,0 SAY CHR(16)
        DO GetKey WITH choice,KEYSTROKES
    ENDDO
    * ---Prompt line selections.
    DO CASE
    CASE choice = Returnkey
        EXIT
    CASE choice = "E"
        * ---Edit current record.
        recnumLAST = RECNO()
        SET FILTER TO
        SAVE SCREEN
        DO DOC_EDIT WITH isedited
        * ---Restore FILTER.
        IF "" <> TRIM( filterSAVE )
            SET FILTER TO &filterSAVE
            GOTO TOP
        ENDIF
        IF recnumLAST = RECNO() .AND. .NOT. isedited
            RESTORE SCREEN
        ELSE
            * ---Redisplay the screen.
            SET COLOR TO &ScreenAtr
            CLEAR
            GOTO recnumLAST
            * ---Do not reposition record pointer.
            panLAST = 0
            PagePaint = .T.
        ENDIF
    CASE choice = "F"
        * ---Find a record.
        DO DOC_NDXS WITH rowPROMPT,choice
        IF choice > "0"
            recnumLAST = RECNO()
            DO DOC_SEEK WITH rowPROMPT
            IF EOF()
                DO SayLine WITH rowPROMPT,"No find."
                WAIT
                @ rowPROMPT,0 CLEAR
                GOTO recnumLAST
            ELSE
                recnumTOP = RECNO()
                PagePaint = .T.
            ENDIF
        ENDIF
        @ rowPROMPT,0 CLEAR
```

```
CASE choice = "G"
   * ---GOTO a record.
   DO DoGOTO WITH rowPROMPT,recnum,LastRec
   IF recnum > 0
      recnumTOP = RECNO()
      PagePaint = .T.
   ENDIF
CASE choice = DelRecord
   * ---Delete the record.
   IF DELETED()
      RECALL
   ELSE
      DELETE
   ENDIF
   DO CASE
   CASE dbfarea = "1"
      DO DOC_ADIS WITH row,1
   CASE dbfarea = "2"
      DO DOC_BDIS WITH row,1
   CASE dbfarea = "3"
      DO DOC_CDIS WITH row,1
   CASE dbfarea = "4"
      DO DOC_DDIS WITH row,1
   CASE dbfarea = "5"
      DO DOC_EDIS WITH row,1
   CASE dbfarea = "6"
      DO DOC_FDIS WITH row,1
   ENDCASE
CASE choice = PgDn
   * ---Page Down.
   IF .NOT. EOF()
      GOTO recnumTOP
      SKIP skipRECS
      IF EOF()
         GOTO BOTTOM
      ENDIF
      recnumTOP = RECNO()
      PagePaint = .T.
   ENDIF
CASE choice = PgUp
   * ---Page Up.
   IF .NOT. BOF()
      GOTO recnumTOP
      SKIP -skipRECS
      IF BOF()
         GOTO TOP
      ENDIF
      recnumTOP = RECNO()
      PagePaint = .T.
   ENDIF
CASE choice = "L"
   * ---Set FILTER.
   SET COLOR TO &WindowAtr
   @ 1,0 CLEAR
   DO DOC_COND WITH expr
   IF "" = TRIM( expr )
      SET FILTER TO
   ELSE
      * ---Check for valid LOGICAL expression.
      IF TYPE( expr ) = "L"
         SET FILTER TO &expr
      ELSE
         SET COLOR TO &PromptAtr
         @ rowPROMPT,0 CLEAR
         @ rowPROMPT,0 SAY "Invalid expression."
         WAIT
```

```
            ENDIF
        ENDIF
        GOTO TOP
        IF EOF()
            SET COLOR TO &PromptAtr
            @ rowPROMPT,0 CLEAR
            @ rowPROMPT,0 SAY "No matching records."
            WAIT
            @ rowPROMPT,0 CLEAR
            SET FILTER TO
            filterSAVE = ""
            GOTO TOP
        ENDIF
        recnumTOP = RECNO()
        PagePaint = .T.
        SET COLOR TO &ScreenAtr
        CLEAR
    CASE choice = HOME
        PagePaint = (pancol <> 1)
        pancol = 1
    CASE choice = LEFTarrow
        IF pancol > 1
            pancol = pancol - 1
            PagePaint = .T.
        ENDIF
    CASE choice = RIGHTarrow
        IF pancol < panMAX
            pancol = pancol + 1
            PagePaint = .T.
        ENDIF
    CASE choice = ENDkey
        PagePaint = (pancol <> panMAX)
        pancol = panMAX
    ENDCASE
ENDDO
SET FILTER TO
GOTO TOP
RETURN
* EOF: DOC_BROW.PRG
```

APPENDIX 9

```
* Program.: DOC_CDIS.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: DISPLAY program for DOCUMENT.DBF
*
PARAMETER row,listRECS
IF listRECS > 1
    * ---Display heading when listing the entire page.
    SET COLOR TO &StatusAtr
    @ rowTOP-1,0
    @ rowTOP-1,0 SAY "Record# "
    DO CASE
    CASE pancol = 1
        ?? "DEPO_EXH------------ BAR_CODE-------"
    ENDCASE
    * ---Clear the window area.
    SET COLOR TO &WindowAtr
    @ rowTOP,0 CLEAR TO rowBOTTOM,79
ENDIF
* ---Display the records.
SET HEADING OFF
SET COLOR TO &WindowAtr
```

```
@ row-1,0 SAY ""
DO CASE
CASE pancol = 1
   LIST NEXT listRECS DEPO_EXH,BAR_CODE
ENDCASE
SET HEADING ON
RETURN
* EOF: DOC_CDIS.PRG
```

APPENDIX 10

```
* Program.: DOC_COND.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: CONDITION program for DOCUMENT.DBF
*
PARAMETER expr
PRIVATE row,rowTOP,recnum,recnumTOP,skipRECS
PRIVATE newexpr,PagePaint,exprTOTAL
expr = ""
newexpr = ""
skipRECS = 18
row = 23
rowTOP = 2
recnum = 0
SELECT H
SET FILTER TO CondArea = dbfarea
GO TOP
IF EOF()
   * ---Automatically Add a new CONDITION.
   DO DOC_EXPR WITH expr
   IF "" <> TRIM(expr)
      APPEND BLANK
      REPLACE CondExpr WITH expr,CondArea WITH dbfarea
      expr = TRIM( expr )
   ENDIF
   SELECT &dbfarea
   RETURN
ENDIF
SET FILTER TO
GOTO TOP
recnumTOP = RECNO()
GOTO BOTTOM
exprTOTAL = RECNO()
PagePaint = .T.
* ---The following is really a REPEAT/UNTIL <exp> loop.
DO WHILE .T.
   IF PagePaint
      SET COLOR TO &WindowAtr
      @ rowTOP,0 CLEAR
      SET COLOR TO &PromptAtr
      @ rowTOP,0 SAY CHR(222) + REPLICATE( CHR(223),78 ) + CHR(221)
      @ rowTOP,34 SAY "<CONDITIONS>"
      @ row-1,0 SAY PromptBar
      @ rowTOP,0 SAY ""
      IF recnumTOP > 0
         GOTO recnumTOP
      ENDIF
      SET HEADING OFF
      LIST NEXT skipRECS SUBSTR( CondExpr,1,69 ) FOR CondArea = dbfarea
      SET HEADING ON
      PagePaint = .F.
```

```
ENDIF
IF "" = expr
   SET COLOR TO &PromptAtr
   @ row-2,0
ELSE
   SET COLOR TO &PromptAtr
   @ row-2,0 SAY "<selected>"
   SET COLOR TO &HiliteAtr
   @ row-2,11 SAY SUBSTR( expr,1,69 )
ENDIF
DO SayLine WITH row,;
   "CONDITION:   (A)dd  (E)dit  (S)elect  <PgUp>  <PgDn>  <Del>  <Return>"
SET COLOR TO &HiliteAtr
@ row,12 SAY "(A)"
@ row,19 SAY "(E)"
@ row,27 SAY "(S)"
@ row,38 SAY "PgUp"
@ row,46 SAY "PgDn"
@ row,54 SAY "Del"
@ row,61 SAY "Return"
SET COLOR TO &PromptAtr
@ row,69 SAY ""
DO GetKey WITH choice,"AES"+PgUp+PgDn+DelRecord+Returnkey
DO CASE
CASE choice = Returnkey
   EXIT
CASE choice = "A"
   * ---Add new CONDITION.
   DO DOC_EXPR WITH newexpr
   IF "" <> TRIM(newexpr)
      APPEND BLANK
      REPLACE CondExpr WITH newexpr,CondArea WITH dbfarea
      expr = CondExpr
         exprTOTAL = exprTOTAL + 1
      ENDIF
      PagePaint = .T.
   CASE choice = "E"
      * ---Edit CONDITION.
      DO GotoRec WITH row,recnum,exprTOTAL
      IF recnum > 0 .AND. CondArea = dbfarea
         recnumTOP = RECNO()
         @ row,0 GET CondExpr
         READ
         expr = CondExpr
         PagePaint = .T.
      ENDIF
   CASE choice = "S"
      * ---Select CONDITION.
      DO GotoRec WITH row,recnum,exprTOTAL
      IF recnum = 0 .OR. CondArea <> dbfarea
         expr = ""
      ELSE
         expr = CondExpr
      ENDIF
   CASE choice = PgDn
      IF .NOT. EOF()
         IF recnumTOP > 0
            GOTO recnumTOP
         ENDIF
         SKIP skipRECS
         IF EOF()
            GOTO BOTTOM
         ENDIF
         recnumTOP = RECNO()
         PagePaint = .T.
      ENDIF
```

```
      CASE choice = PgUp
         IF .NOT. BOF()
            IF recnumTOP > 0
               GOTO recnumTOP
            ENDIF
            SKIP -skipRECS
            IF BOF()
               GOTO TOP
            ENDIF
            recnumTOP = RECNO()
            PagePaint = .T.
         ENDIF
      CASE choice = DelRecord
         * ---Delete the record.
         DO GotoRec WITH row,recnum,exprTOTAL
         IF recnum > 0 .AND. CondArea = dbfarea
            DELETE
            PACK
            IF exprTOTAL > 0
               exprTOTAL = exprTOTAL - 1
            ENDIF
            GOTO TOP
            IF EOF()
               recnumTOP = 0
               expr = ""
            ELSE
               recnumTOP = RECNO()
            ENDIF
            PagePaint = .T.
         ENDIF
      ENDCASE
ENDDO
expr = TRIM( expr )
SELECT &dbfarea
RETURN
* EOF: DOC_COND.PRG
```

APPENDIX 11

```
* Program.: DOC_CPHR.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: PHRASE program for DOCUMENT.DBF
*
PARAMETER firstrow,fldnum,phrase
PRIVATE row,col,oper,opernum,operMAX
PRIVATE fldnam,fldtyp,fldwid,flddec,fldget
row = firstrow
opernum = 0
*
* ---Get field information:  fldnam,fldtyp,fldwid,flddec
fldnam = SUBSTR(;
   "DEPO_EXH   BAR_CODE  ",;
   fldnum*10-9,10 )
@ row+1,0
SET COLOR TO &HiliteAtr
@ row+1,0 SAY fldnam
fldnam = TRIM( fldnam )
fldtyp = SUBSTR( "CC",fldnum,1 )
fldwid = VAL( SUBSTR(;
   " 20 15",;
   fldnum*3-2,3 ) )
DO CASE
```

```
CASE fldtyp = "C"
   fldget = SPACE( fldwid )
CASE fldtyp = "D"
   fldget = CTOD( "  /  /  " )
CASE fldtyp = "N"
   fldget = 0.00
   flddec = VAL( SUBSTR(;
      " 0 0",;
      fldnum*2-1,2 ) )
CASE fldtyp = "M"
   fldget = SPACE( 65 )
   opernum = 8
OTHERWISE
   fldget = .T.
   opernum = 1
ENDCASE
*
* ---Get OPERATOR.
SET COLOR TO &WindowAtr
IF opernum = 0
   opernum = 1
   operMAX = VAL( SUBSTR( "8661",AT( fldtyp,"CDNL" ),1 ) )
   @ row,0
   @ row,0 SAY "Enter OPERATOR #" GET opernum PICTURE "99" RANGE 1,operMAX
   READ
   IF opernum = 8
      fldget = SPACE( 65 )
   ENDIF
ENDIF
oper = TRIM( SUBSTR( " = < > >=< <=$ $ ",opernum*2,2 ) )
SET COLOR TO &HiliteAtr
@ row+1,12 SAY oper
*
* ---Get field VALUE.
SET COLOR TO &WindowAtr
@ row,0
@ row,0 SAY "Enter VALUE to compare"
row = row + 1
col = 15
DO CASE
CASE fldnum <= 2
   @ row,col GET fldget
ENDCASE
READ
*
* ---Build phrase.
DO CASE
CASE fldtyp = "M"
   phrase = ["]+TRIM(fldget)+["] + oper + fldnam
CASE (fldtyp = "C") .OR. (opernum = 7)
   IF opernum = 7
      phrase = ["]+UPPER(TRIM(fldget))+["] + oper + "UPPER("+fldnam+")"
   ELSE
      phrase = "UPPER("+fldnam+")" + oper + ["]+UPPER(TRIM(fldget))+["]
   ENDIF
CASE fldtyp = "N"
   phrase = fldnam + oper + LTRIM( STR( fldget,fldwid,flddec ) )
CASE fldtyp = "D"
   IF DTOC(fldget) = "  /  /  "
      phrase = [DTOC(] + fldnam + [)] + oper + ["  /  /  "]
   ELSE
      phrase = fldnam + oper + [CTOD("] + DTOC(fldget) + [")]
   ENDIF
CASE fldget
   phrase = fldnam
OTHERWISE
   phrase = ".NOT." + fldnam
```

```
ENDCASE
phrase = "(" + phrase + ")"
RETURN
* EOF: DOC_CPHR.PRG
```

APPENDIX 12

```
* Program.: DOC_DDIS.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: DISPLAY program for DOCUMENT.DBF
*
PARAMETER row,listRECS
IF listRECS > 1
   * ---Display heading when listing the entire page.
   SET COLOR TO &StatusAtr
   @ rowTOP-1,0
   @ rowTOP-1,0 SAY "Record# "
   DO CASE
   CASE pancol = 1
      ?? "BAR_CODE------- ACTION WITNESS----------------------"
   ENDCASE
   * ---Clear the window area.
   SET COLOR TO &WindowAtr
   @ rowTOP,0 CLEAR TO rowBOTTOM,79
ENDIF
* ---Display the records.
SET HEADING OFF
SET COLOR TO &WindowAtr
@ row-1,0 SAY ""
DO CASE
CASE pancol = 1
   LIST NEXT listRECS BAR_CODE,ACTION," ",WITNESS
ENDCASE
SET HEADING ON
RETURN
* EOF: DOC_DDIS.PRG
```

APPENDIX 13

```
* Program.: DOC_DPHR.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: PHRASE program for DOCUMENT.DBF
*
PARAMETER firstrow,fldnum,phrase
PRIVATE row,col,oper,opernum,operMAX
PRIVATE fldnam,fldtyp,fldwid,flddec,fldget
row = firstrow
opernum = 0
*
* ---Get field information: fldnam,fldtyp,fldwid,flddec
fldnam = SUBSTR(;
   "BAR_CODE   ACTION     WITNESS   ",;
   fldnum*10-9,10 )
@ row+1,0
SET COLOR TO &HiliteAtr
@ row+1,0 SAY fldnam
fldnam = TRIM( fldnam )
fldtyp = SUBSTR( "CCC",fldnum,1 )
fldwid = VAL( SUBSTR(;
   " 15  4 30",;
   fldnum*3-2,3 ) )
```

```
DO CASE
CASE fldtyp = "C"
   fldget = SPACE( fldwid )
CASE fldtyp = "D"
   fldget = CTOD( "  /  /  " )
CASE fldtyp = "N"
   fldget = 0.00
   flddec = VAL( SUBSTR(;
   " 0 0 0",;
   fldnum*2-1,2 ) )
CASE fldtyp = "M"
   fldget = SPACE( 65 )
   opernum = 8
OTHERWISE
   fldget = .T.
   opernum = 1
ENDCASE
*
* ---Get OPERATOR.
SET COLOR TO &WindowAtr
IF opernum = 0
   opernum = 1
   operMAX = VAL( SUBSTR( "8661",AT( fldtyp,"CDNL" ),1 ) )
   @ row,0
   @ row,0 SAY "Enter OPERATOR #" GET opernum PICTURE "99" RANGE 1,operMAX
   READ
   IF opernum = 8
      fldget = SPACE( 65 )
   ENDIF
ENDIF
oper = TRIM( SUBSTR( "  =  <  >  >=< <=$  $ ",opernum*2,2 ) )
SET COLOR TO &HiliteAtr
@ row+1,12 SAY oper
*
* ---Get field VALUE.
SET COLOR TO &WindowAtr
@ row,0
@ row,0 SAY "Enter VALUE to compare"
row = row + 1
col = 15
DO CASE
CASE fldnum < 2
   @ row,col GET fldget
CASE fldnum = 2
   @ row,col GET fldget
CASE fldnum <= 3
   @ row,col GET fldget
ENDCASE
READ
*
* ---Build phrase.
DO CASE
CASE fldtyp = "M"
   phrase = ["]+TRIM(fldget)+["] + oper + fldnam
CASE (fldtyp = "C") .OR. (opernum = 7)
   IF opernum = 7
      phrase = ["]+UPPER(TRIM(fldget))+["] + oper + "UPPER("+fldnam+")"
   ELSE
      phrase = "UPPER("+fldnam+")" + oper + ["]+UPPER(TRIM(fldget))+["]
   ENDIF
CASE fldtyp = "N"
   phrase = fldnam + oper + LTRIM( STR( fldget,fldwid,flddec ) )
CASE fldtyp = "D"
   IF DTOC(fldget) = "  /  /  "
      phrase = [DTOC(] + fldnam + [)] + oper + ["  /  /  "]
   ELSE
      phrase = fldnam + oper + [CTOD("] + DTOC(fldget) + [")]
```

```
      ENDIF
   CASE fldget
      phrase = fldnam
   OTHERWISE
      phrase = ".NOT." + fldnam
   ENDCASE
phrase = "(" + phrase + ")"
RETURN
* EOF: DOC_DPHR.PRG
```

APPENDIX 14

```
* Program.: DOC_EDIS.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: DISPLAY program for DOCUMENT.DBF
*
PARAMETER row,listRECS
IF listRECS > 1
   * ---Display heading when listing the entire page.
   SET COLOR TO &StatusAtr
   @ rowTOP-1,0
   @ rowTOP-1,0 SAY "Record# "
   DO CASE
   CASE pancol = 1
      ?? "BAR_CODE------- COMMENT------------------------------------
      "
   CASE pancol = 2
      ?? "PROD_NO--------"
   ENDCASE
   * ---Clear the window area.
   SET COLOR TO &WindowAtr
   @ rowTOP,0 CLEAR TO rowBOTTOM,79
ENDIF
* ---Display the records.
SET HEADING OFF
SET COLOR TO &WindowAtr
@ row-1,0 SAY ""
DO CASE
CASE pancol = 1
   LIST NEXT listRECS BAR_CODE,COMMENT
CASE pancol = 2
   LIST NEXT listRECS PROD_NO
ENDCASE
SET HEADING ON
RETURN
* EOF: DOC_EDIS.PRG
```

APPENDIX 15

```
* Program.: DOC_EDIT.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: EDIT program for DOCUMENT.DBF
*
PARAMETER isedited
PRIVATE row,lastpage,editchoice,ndxchoice
PRIVATE IsBlank,IsUnique
row = PromptRow
expr = ""
STORE .F. TO isedited,IsBlank,IsUnique
DO DOC_FORM
DO SayRec
```

```
menuchoice = 9
editchoice = "*"
ndxchoice = "*"
* ---Loop until {Return} is pressed.
* ---The following loop is really a "REPEAT/UNTIL <cond>".
DO WHILE .T.
   SET COLOR TO &PromptAtr
   IF .NOT. (editchoice $ "NP"+DelRecord)
      @ row,0 CLEAR
   ENDIF
   @ row,0 SAY "EDIT/VIEW:  Delete   Edit   Find   Goto   Locate"
   @ row,12 PROMPT "Delete"
   @ row,21 PROMPT "Edit"
   @ row,28 PROMPT "Find"
   @ row,35 PROMPT "Goto"
   @ row,42 PROMPT "Locate"
   @ row+1,12 SAY "Next-record   Prev-record   Select   Return"
   @ row+1,12 PROMPT "Next-record"
   @ row+1,26 PROMPT "Prev-record"
   @ row+1,40 PROMPT "Select"
   @ row+1,49 PROMPT "Return"
   MENU TO menuchoice
   editchoice=SUBSTR(Returnkey+DelRecord+"EFGLNPS"+Returnkey,menuchoice+1,1)
   DO CASE
   CASE editchoice = Returnkey
      EXIT
   CASE editchoice = "F"
      * ---Find a record.
      DO DOC_NDXS WITH row,ndxchoice
      IF ndxchoice > "0"
         oldrecnum = RECNO()
         DO DOC_SEEK WITH row
         IF EOF()
            DO SayLine WITH row,"No find."
            WAIT
            GOTO oldrecnum
         ELSE
            DO SayRec
         ENDIF
      ENDIF
   CASE editchoice = "N"
      * ---Next record.
      IF EOF()
         DO SayLine WITH row,"END-OF-FILE encountered"
         WAIT
         @ row,0 CLEAR
      ELSE
         oldrecnum = RECNO()
         SKIP
         IF EOF()
            DO SayEOF WITH row,oldrecnum
         ELSE
            DO SayRec
         ENDIF
      ENDIF
   CASE editchoice = "P"
      * ---Previous record.
      IF BOF() .OR. EOF()
         DO SayLine WITH row,"BEGINNING-OF-FILE encountered"
         WAIT
         @ row,0 CLEAR
      ELSE
         oldrecnum = RECNO()
         SKIP -1
         IF BOF()
            DO SayEOF WITH row,oldrecnum
         ELSE
```

```
              DO SayRec
           ENDIF
        ENDIF
     CASE editchoice = "E"
        * ---Edit the record.
        isedited = .T.
        DO DOC_STOR
        DO SayLine WITH row,"Press {Ctrl-W} to Exit"
        * ---If you don't want the user to edit the
        * ---key fields, then delete the following line.
        DO DOC_KEYS WITH expr,IsBlank,IsUnique
        DO DOC_GETS
        DO DOC_REPL
     CASE editchoice = "L"
        * ---Locate a record.
        SET COLOR TO &WindowAtr
        @ 1,0 CLEAR
        DO DOC_COND WITH expr
        DO DOC_FORM
        DO SayRec
        IF "" <> TRIM( expr )
           * ---Check for valid LOGICAL expression.
           IF TYPE( expr ) = "L"
              DO DoLOCATE WITH row,expr
           ELSE
              SET COLOR TO &PromptAtr
              @ row,0 CLEAR
              @ row,0 SAY "Invalid expression."
              WAIT
           ENDIF
        ENDIF
     CASE editchoice = "G"
        * ---Goto a record.
           DO DoGOTO WITH row,recnum,LastRec
           IF recnum > 0
              DO SayRec
           ENDIF
           menuchoice = 3
     CASE editchoice = DelRecord
        * ---Delete the record.
        isedited = .T.
        IF DELETED()
           RECALL
        ELSE
           DELETE
        ENDIF
        DO StatLine WITH RECNO(),DELETED()
     CASE editchoice = "S"
        * ---Select database file.
        DO DOC_FILE WITH row,choice
        DO StatLine WITH RECNO(),DELETED()
     ENDCASE
ENDDO
RETURN
* EOF: DOC_EDIT.PRG
```

APPENDIX 16

```
* Program.: DOC_EPHR.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: PHRASE program for DOCUMENT.DBF
*
PARAMETER firstrow,fldnum,phrase
PRIVATE row,col,oper,opernum,operMAX
```

```
PRIVATE fldnam,fldtyp,fldwid,flddec,fldget
row = firstrow
opernum = 0
*
* ---Get field information:  fldnam,fldtyp,fldwid,flddec
fldnam = SUBSTR(;
    "BAR_CODE   COMMENT    PROD_NO   ",;
    fldnum*10-9,10 )
@ row+1,0
SET COLOR TO &HiliteAtr
@ row+1,0 SAY fldnam
fldnam = TRIM( fldnam )
fldtyp = SUBSTR( "CCC",fldnum,1 )
fldwid = VAL( SUBSTR(;
    " 15 50 15",;
    fldnum*3-2,3 ) )
DO CASE
CASE fldtyp = "C"
    fldget = SPACE( fldwid )
CASE fldtyp = "D"
    fldget = CTOD( "  /  /  " )
CASE fldtyp = "N"
    fldget = 0.00
    flddec = VAL( SUBSTR(;
    " 0 0 0",;
    fldnum*2-1,2 ) )
CASE fldtyp = "M"
    fldget = SPACE( 65 )
    opernum = 8
OTHERWISE
    fldget = .T.
    opernum = 1
ENDCASE
*
* ---Get OPERATOR.
SET COLOR TO &WindowAtr
IF opernum = 0
    opernum = 1
    operMAX = VAL( SUBSTR( "8661",AT( fldtyp,"CDNL" ),1 ) )
    @ row,0
    @ row,0 SAY "Enter OPERATOR #" GET opernum PICTURE "99" RANGE 1,operMAX
    READ
    IF opernum = 8
        fldget = SPACE( 65 )
    ENDIF
ENDIF
oper = TRIM( SUBSTR( " = < > >=< <=$ $ ",opernum*2,2 ) )
SET COLOR TO &HiliteAtr
@ row+1,12 SAY oper
*
* ---Get field VALUE.
SET COLOR TO &WindowAtr
@ row,0
@ row,0 SAY "Enter VALUE to compare"
row = row + 1
col = 15
DO CASE
CASE fldnum < 3
    @ row,col GET fldget
CASE fldnum = 3
    @ row,col GET fldget PICTURE "@S9"
ENDCASE
READ
*
* ---Build phrase.
DO CASE
CASE fldtyp = "M"
```

```
      phrase = ["]+TRIM(fldget)+["] + oper + fldnam
CASE (fldtyp = "C") .OR. (opernum = 7)
   IF opernum = 7
      phrase = ["]+UPPER(TRIM(fldget))+["] + oper + "UPPER("+fldnam+")"
   ELSE
      phrase = "UPPER("+fldnam+")" + oper + ["]+UPPER(TRIM(fldget))+["]
   ENDIF
CASE fldtyp = "N"
   phrase = fldnam + oper + LTRIM( STR( fldget,fldwid,flddec ) )
CASE fldtyp = "D"
   IF DTOC(fldget) = "  /  /  "
      phrase = [DTOC(] + fldnam + [)] + oper + ["  /  /  "]
   ELSE
      phrase = fldnam + oper + [CTOD("] + DTOC(fldget) + [")]
   ENDIF
CASE fldget
   phrase = fldnam
OTHERWISE
   phrase = ".NOT." + fldnam
ENDCASE
phrase = "(" + phrase + ")"
RETURN
* EOF: DOC_EPHR.PRG
```

APPENDIX 17

```
* Program.: DOC_EXPR.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: EXPRESSION program for DOCUMENT.DBF
*
PARAMETER expr
PRIVATE row,fldnum,fldmax,phrase,connector
row = 20
expr = ""
phrase = ""
connector = " "
SET COLOR TO &WindowAtr
@ 2,0 CLEAR
SET COLOR TO &PromptAtr
@ 22,0 SAY PromptBar
SET COLOR TO &WindowAtr
@ 1,0 SAY ""
*
DO CASE
CASE dbfarea = "1"
fldmax = 23
```

| #. Field | | #. Field | | #. Operators | |
|---|---|---|---|---|---|
| 1. | Bar_code | 15. | Key_word | 1. | Equal |
| 2. | Prod_no | 16. | Prior_art | 2. | Not equal |
| 3. | Prod_noend | 17. | Flag_1 | 3. | Greater than |
| 4. | Source | 18. | Flag_2 | 4. | Greater or equal |
| 5. | Masked | 19. | Flag_3 | 5. | Less than |
| 6. | In_margin | 20. | Flag_4 | 6. | Less or equal |
| 7. | Doc_type | 21. | Flag_5 | 7. | Contains |
| 8. | Doc_date | 22. | Producedto | 8. | Is Contained in |
| 9. | Total_page | 23. | Immunity | {C} = Connectors | |
| 10. | Rating | 24. | | | |
| 11. | Duplicates | 25. | | ' ' = <exit> | |
| 12. | Confid | 26. | | 'A' = .AND. | |
| 13. | Descript | 27. | | 'O' = .OR. | |
| 14. | Tag | 28. | | | |

```
CASE dbfarea = "2"
fldmax = 4
```

```
? "
? " | #. Field        | #. Operators          | "
? "                                            "
? " | 1. BAR_CODE    | 1. Equal              | "
? " | 2. ACTION      | 2. Not equal          | "
? " | 3. NAME        | 3. Greater than       | "
? " | 4. NAME_FIRM   | 4. Greater or equal   | "
? " | 5.             | 5. Less than          | "
? " | 6.             | 6. Less or equal      | "
? " | 7.             | 7. Contains           | "
? " | 8.             | 8. Is Contained in    | "
? " | 9.                                      | "
? " | 10.            | {C} = Connectors      | "
? " | 11.                                     | "
? " | 12.            | ' ' = <exit>          | "
? " | 13.            | 'A' = .AND.           | "
? " | 14.            | 'O' = .OR.            | "
? "
CASE dbfarea = "3"
fldmax = 2
? "
? " | #. Field        | #. Operators          | "
? "                                            "
? " | 1. DEPO_EXH    | 1. Equal              | "
? " | 2. BAR_CODE    | 2. Not equal          | "
? " | 3.             | 3. Greater than       | "
? " | 4.             | 4. Greater or equal   | "
? " | 5.             | 5. Less than          | "
? " | 6.             | 6. Less or equal      | "
? " | 7.             | 7. Contains           | "
? " | 8.             | 8. Is Contained in    | "
? " | 9.                                      | "
? " | 10.            | {C} = Connectors      | "
? " | 11.                                     | "
? " | 12.            | ' ' = <exit>          | "
? " | 13.            | 'A' = .AND.           | "
? " | 14.            | 'O' = .OR.            | "
? "
CASE dbfarea = "4"
fldmax = 3
? "
? " | #. Field        | #. Operators          | "
? "                                            "
? " | 1. BAR_CODE    | 1. Equal              | "
? " | 2. ACTION      | 2. Not equal          | "
? " | 3. WITNESS     | 3. Greater than       | "
? " | 4.             | 4. Greater or equal   | "
? " | 5.             | 5. Less than          | "
? " | 6.             | 6. Less or equal      | "
? " | 7.             | 7. Contains           | "
? " | 8.             | 8. Is Contained in    | "
? " | 9.                                      | "
? " | 10.            | {C} = Connectors      | "
? " | 11.                                     | "
? " | 12.            | ' ' = <exit>          | "
? " | 13.            | 'A' = .AND.           | "
? " | 14.            | 'O' = .OR.            | "
? "
CASE dbfarea = "5"
fldmax = 3
```

```
? "
? " ┌─────────────────┬──────────────────────┐ "
? " │ #. Field        │ #. Operators         │ "
? " ├─────────────────┼──────────────────────┤ "
? " │ 1. BAR_CODE     │ 1. Equal             │ "
? " │ 2. COMMENT      │ 2. Not equal         │ "
? " │ 3. PROD_NO      │ 3. Greater than      │ "
? " │ 4.              │ 4. Greater or equal  │ "
? " │ 5.              │ 5. Less than         │ "
? " │ 6.              │ 6. Less or equal     │ "
? " │ 7.              │ 7. Contains          │ "
? " │ 8.              │ 8. Is Contained in   │ "
? " │ 9.              │                      │ "
? " │ 10.             │ {C} = Connectors     │ "
? " │ 11.             ├──────────────────────┤ "
? " │ 12.             │ ' ' = <exit>         │ "
? " │ 13.             │ 'A' = .AND.          │ "
? " │ 14.             │ 'O' = .OR.           │ "
? " └─────────────────┴──────────────────────┘ "
CASE dbfarea = "6"
fldmax = 5
? "
? " ┌─────────────────┬──────────────────────┐ "
? " │ #. Field        │ #. Operators         │ "
? " ├─────────────────┼──────────────────────┤ "
? " │ 1. BAR_CODE     │ 1. Equal             │ "
? " │ 2. TRIAL_EXH    │ 2. Not equal         │ "
? " │ 3. WITNESS      │ 3. Greater than      │ "
? " │ 4. OBJECTION    │ 4. Greater or equal  │ "
? " │ 5. OFFER_ADM    │ 5. Less than         │ "
? " │ 6.              │ 6. Less or equal     │ "
? " │ 7.              │ 7. Contains          │ "
? " │ 8.              │ 8. Is Contained in   │ "
? " │ 9.              │                      │ "
? " │ 10.             │ {C} = Connectors     │ "
? " │ 11.             ├──────────────────────┤ "
? " │ 12.             │ ' ' = <exit>         │ "
? " │ 13.             │ 'A' = .AND.          │ "
? " │ 14.             │ 'O' = .OR.           │ "
? " └─────────────────┴──────────────────────┘ "
ENDCASE
*
IF fldmax = 0
    @ 23,0 SAY "No fields to build expression"
    WAIT
    RETURN
ENDIF
* ---This is really a REPEAT/UNTIL <exp> loop.
DO WHILE .T.
    fldnum = 0
    @ row+1,0
    @ row,0
    @ row,0 SAY "Enter FIELD #";
        GET fldnum PICTURE "@Z 99" RANGE 0,fldmax
    READ
    IF fldnum = 0
        EXIT
    ENDIF
    *
    DO CASE
    CASE dbfarea = "1"
        DO DOC_APHR WITH row,fldnum,phrase
    CASE dbfarea = "2"
        DO DOC_BPHR WITH row,fldnum,phrase
    CASE dbfarea = "3"
        DO DOC_CPHR WITH row,fldnum,phrase
    CASE dbfarea = "4"
        DO DOC_DPHR WITH row,fldnum,phrase
    CASE dbfarea = "5"
```

```
         DO DOC_EPHR WITH row,fldnum,phrase
      CASE dbfarea = "6"
         DO DOC_FPHR WITH row,fldnum,phrase
      ENDCASE
      DO CASE
      CASE "" = expr
         expr = phrase
      CASE connector = "A"
         expr = expr + ".AND." + phrase
      OTHERWISE
         expr = expr + ".OR." + phrase
      ENDCASE
      * ---Display expression.
      @ row+3,0 SAY expr
      * ---Get CONNECTOR selection.
      @ row+1,0
      @ row,0
      connector = "*"
      DO WHILE .NOT. (connector $ " AO")
         connector = " "
         @ row,0 SAY "Enter CONNECTOR" GET connector PICTURE "!"
         READ
      ENDDO
      DO CASE
      CASE connector = " " .OR. LEN(expr) > 100
         EXIT
      CASE connector = "A"
         @ row+3,0 SAY expr + ".AND."
      OTHERWISE
         @ row+3,0 SAY expr + ".OR."
      ENDCASE
ENDDO
RETURN
* EOF: DOC_EXPR.PRG
```

APPENDIX 18

```
* Program.: DOC_FDIS.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: DISPLAY program for DOCUMENT.DBF
*
PARAMETER row,listRECS
IF listRECS > 1
   * ---Display heading when listing the entire page.
   SET COLOR TO &StatusAtr
   @ rowTOP-1,0
   @ rowTOP-1,0 SAY "Record# "
   DO CASE
   CASE pancol = 1
      ?? "BAR_CODE------- TRIAL_EXH------"
   CASE pancol = 2
      ?? "WITNESS-------------------------------------------------------------"
   CASE pancol = 3
      ?? "OBJECTION--------------- OFFER_ADM-----------"
   ENDCASE
   * ---Clear the window area.
   SET COLOR TO &WindowAtr
   @ rowTOP,0 CLEAR TO rowBOTTOM,79
ENDIF
* ---Display the records.
SET HEADING OFF
SET COLOR TO &WindowAtr
@ row-1,0 SAY ""
```

```
DO CASE
CASE pancol = 1
   LIST NEXT listRECS BAR_CODE,TRIAL_EXH
CASE pancol = 2
   LIST NEXT listRECS SUBSTR(WITNESS,1,70)
CASE pancol = 3
   LIST NEXT listRECS OBJECTION,OFFER_ADM
ENDCASE
SET HEADING ON
RETURN
* EOF: DOC_FDIS.PRG
```

APPENDIX 19

```
* Program.: DOC_FPHR.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: PHRASE program for DOCUMENT.DBF
*
PARAMETER firstrow,fldnum,phrase
PRIVATE row,col,oper,opernum,operMAX
PRIVATE fldnam,fldtyp,fldwid,flddec,fldget
row = firstrow
opernum = 0
*
* ---Get field information:  fldnam,fldtyp,fldwid,flddec
fldnam = SUBSTR(;
   "BAR_CODE   TRIAL_EXH WITNESS    OBJECTION OFFER_ADM ",;
   fldnum*10-9,10 )
@ row+1,0
SET COLOR TO &HiliteAtr
@ row+1,0 SAY fldnam
fldnam = TRIM( fldnam )
fldtyp = SUBSTR( "CCCCC",fldnum,1 )
fldwid = VAL( SUBSTR(;
   " 15 15 75 25 20",;
   fldnum*3-2,3 ) )
DO CASE
CASE fldtyp = "C"
   fldget = SPACE( fldwid )
CASE fldtyp = "D"
   fldget = CTOD( "  /  /  " )
CASE fldtyp = "N"
   fldget = 0.00
   flddec = VAL( SUBSTR(;
      " 0 0 0 0 0",;
      fldnum*2-1,2 ) )
CASE fldtyp = "M"
   fldget = SPACE( 65 )
   opernum = 8
OTHERWISE
   fldget = .T.
   opernum = 1
ENDCASE
*
* ---Get OPERATOR.
SET COLOR TO &WindowAtr
IF opernum = 0
   opernum = 1
   operMAX = VAL( SUBSTR( "8661",AT( fldtyp,"CDNL" ),1 ) )
   @ row,0
   @ row,0 SAY "Enter OPERATOR #" GET opernum PICTURE "99" RANGE 1,operMAX
   READ
   IF opernum = 8
      fldget = SPACE( 65 )
```

```
     ENDIF
ENDIF
oper = TRIM( SUBSTR( " = < > >=< <=$ $ ",opernum*2,2 ) )
SET COLOR TO &HiliteAtr
@ row+1,12 SAY oper
*
* ---Get field VALUE.
SET COLOR TO &WindowAtr
@ row,0
@ row,0 SAY "Enter VALUE to compare"
row = row + 1
col = 15
DO CASE
CASE fldnum < 3
   @ row,col GET fldget
CASE fldnum = 3
   @ row,col GET fldget PICTURE "@S20"
CASE fldnum = 4
   @ row,col GET fldget PICTURE "@S20"
CASE fldnum = 5
   @ row,col GET fldget PICTURE "@S20"
ENDCASE
READ
*
* ---Build phrase.
DO CASE
CASE fldtyp = "M"
   phrase = ["]+TRIM(fldget)+["] + oper + fldnam
CASE (fldtyp = "C") .OR. (opernum = 7)
   IF opernum = 7
      phrase = ["]+UPPER(TRIM(fldget))+["] + oper + "UPPER("+fldnam+")"
   ELSE
      phrase = "UPPER("+fldnam+")" + oper + ["]+UPPER(TRIM(fldget))+["]
   ENDIF
CASE fldtyp = "N"
   phrase = fldnam + oper + LTRIM( STR( fldget,fldwid,flddec ) )
CASE fldtyp = "D"
   IF DTOC(fldget) = "  /  /  "
      phrase = [DTOC(] + fldnam + [)] + oper + ["  /  /  "]
   ELSE
      phrase = fldnam + oper + [CTOD("] + DTOC(fldget) + [")]
   ENDIF
CASE fldget
   phrase = fldnam
OTHERWISE
   phrase = ".NOT." + fldnam
ENDCASE
phrase = "(" + phrase + ")"
RETURN
* EOF: DOC_FPHR.PRG
```

APPENDIX 20

```
* Program.: DOC_HELP.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: HELP program for DOCUMENT.DBF
*
SET COLOR TO &ScreenAtr
CLEAR
SET COLOR TO &StatusAtr
@  0, 0 SAY SPACE(80)
@  0, 0 SAY "C:" + DBFname
@  0,72 SAY DATE()
```

```
SET COLOR TO &PromptAtr
@ 21, 0 SAY PromptBar
SET COLOR TO &WindowAtr
@ 1,0 SAY ""
? "
? "          Functional OVERVIEW           ██████████████"
? "                                        ██████████████"
? "                                        ██████████████"
? "                                        ██████████████"
? "      ┌─────────┬─────────┬────────────┬─────────┬────────┐                    "
? "  ███████   ███████   ██████████   ███████   ██████              ████████"
? "  ███████   ███████   ██████████   ███████   ██████              ████████"
? "  ███████   ███████   ██████████   ███████   ██████              ████████"
? "add records   display     |sub-menu   mailing   remove del-
print"
? "to Datafile   records     |           labels    eted records
report"
? "
? "                                    |"
? "                    ┌──────┬──────┬──────┬──────┬──────┐          "
? "     ██████   ██████   ██████   ███████   ██████   ██████████"
? "     ██████   ██████   ██████   ███████   ██████   ██████████"
? "     ██████   ██████   ██████   ███████   ██████   ██████████"
? "     edit     search    top,     search    display   display"
? "     current  on index   bottom,  on select next      previous"
? "     record   key        record#  fields    record    record"
SET COLOR TO N/W
@  3,34 SAY "DOCUMENT.PRG"
@  4,34 SAY "DOC_XXXX.PRG"
@  8, 2 SAY "APPEND"
@  8,15 SAY "BROWSE"
@  8,28 SAY "EDIT/VIEW"
@  8,44 SAY "LABELS"
@  8,57 SAY "PACK"
@  8,68 SAY "REPORT"
@ 15, 3 SAY "EDIT"
@ 15,14 SAY "FIND"
@ 15,26 SAY "GOTO"
@ 15,38 SAY "LOCATE"
@ 15,52 SAY "NEXT"
@ 15,63 SAY "PREVIOUS"
@ 21, 0 SAY ""
SET COLOR TO &PromptAtr
WAIT
RETURN
* EOF: DOC_HELP.PRG
```

APPENDIX 21

```
* Program.: DOC_LABE.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: LABEL program for DOCUMENT.DBF
*
PRIVATE filename,savrecnum,isprinter,ndxchoice
*
savrecnum = RECNO()
SET COLOR TO &ScreenAtr
CLEAR
@  0, 0 SAY "P R I N T     L A B E L S"
@  0,72 SAY DATE()
@  1, 0 SAY PromptBar
* ---Display label forms.
@  5, 0 SAY REPLICATE( CHR(22),80 )
```

```
@  6, 0 SAY "Directory of DOC_*.LBL"
DIR DOC_*.LBL
filename = "        "
@  3, 0 SAY "Enter LABEL FORM filename: DOC_     .LBL"
@  3,31 GET filename PICTURE "@!"
READ
* ---Remove the file extension.
filename = UPPER( filename + "." )
filename = TRIM( SUBSTR( filename,1,AT(".",filename)-1 ) )
IF "" = filename
   RETURN
ENDIF
filename = "DOC_" + filename + ".LBL"
* ---If the file does not exist, create it or exit.
IF .NOT. FILE( filename )
   choice = " "
   @ 3,0 CLEAR
   @ 3,0 SAY filename + " does not exist."
   WAIT
   RETURN
ENDIF
*
* ---Select index for Labels.
IF NdxTotal > 1
   choice = " "
   @ 2,0 CLEAR
   @ 3,0 SAY "Select INDEX for Labels? (y/n)";
        GET choice PICTURE "!"
   READ
   ndxchoice = "*"
   IF choice = "Y"
      * ---Select the index.
      DO DOC_NDXS WITH 4,ndxchoice
   ENDIF
ENDIF
*
* ---Get the FOR <exp>.
expr = ""
choice = " "
@ 2,0 CLEAR
@ 3,0 SAY "Specify a CONDITION on the output? (y/n)" GET choice PICTURE "!"
READ
IF choice = "Y"
   DO DOC_COND WITH expr
   IF "" <> TRIM( expr )
      * ---Check for valid LOGICAL expression.
      IF TYPE( expr ) <> "L"
         expr = ""
      ENDIF
   ENDIF
ENDIF
* ---Screen or printer selection.
choice = " "
@ 2,0 CLEAR
@ 3,0 SAY "Output to the (S)creen or (P)rinter?" GET choice PICTURE "!"
READ
isprinter = (choice = "P")
* ---Print the labels.
GOTO TOP
DO CASE
CASE choice = " "
   RETURN
CASE isprinter
   @ 3,0 CLEAR
   @ 3,0 SAY "Printing labels..."
   SET CONSOLE OFF
   IF "" <> TRIM( expr )
```

```
        LABEL FORM &filename FOR &expr TO PRINT WHILE PausePRN(isprinter)
    ELSE
        LABEL FORM &filename TO PRINT WHILE PausePRN(isprinter)
    ENDIF
    SET CONSOLE ON
OTHERWISE
    SET COLOR TO &ScreenAtr
    CLEAR
    IF "" <> TRIM( expr )
        LABEL FORM &filename FOR &expr WHILE PausePRN(isprinter)
    ELSE
        LABEL FORM &filename WHILE PausePRN(isprinter)
    ENDIF
    WAIT
ENDCASE
IF savrecnum > 0
    GOTO savrecnum
ENDIF
RETURN
* EOF: DOC_LABE.PRG
```

APPENDIX 22

```
* Program.: DOC_MENU.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: MENU program for DOCUMENT.DBF
*
PARAMETER choice
PRIVATE col
SET COLOR TO &ScreenAtr
CLEAR
@ 0, 0 SAY "DOCUMENTPEOPLE  DEPO    DEPO_WITCOMMENT TRIAL   "
@ 0,72 SAY DATE()
DO CASE
CASE dbfarea = "1"
    SET COLOR TO &HiliteAtr
    @ 0,0 SAY "DOCUMENT"
CASE dbfarea = "2"
    SET COLOR TO &HiliteAtr
    @ 0,8 SAY "PEOPLE  "
CASE dbfarea = "3"
    SET COLOR TO &HiliteAtr
    @ 0,16 SAY "DEPO    "
CASE dbfarea = "4"
    SET COLOR TO &HiliteAtr
    @ 0,24 SAY "DEPO_WIT"
CASE dbfarea = "5"
    SET COLOR TO &HiliteAtr
    @ 0,32 SAY "COMMENT "
CASE dbfarea = "6"
    SET COLOR TO &HiliteAtr
    @ 0,40 SAY "TRIAL   "
ENDCASE
SET COLOR TO &ScreenAtr
* ---Center the menu heading.
menuhdg = "D O C U M E N T    M A I N    M E N U"
col = (80 - LEN(menuhdg)) / 2
@ 1,0,16,79 BOX "┌─┐│┘─└│"
@ 3, 0 SAY "╞══════════════════════════════════════"
@ 3,40 SAY "══════════════════════════════════════╡"
@ 2,col SAY menuhdg
SET COLOR TO &PromptAtr
SET MESSAGE TO 18
```

```
menuchoice = AT( choice,"QABEHLPRSKI" )
IF (menuchoice < 1) .OR. (menuchoice > 11)
   menuchoice = 4
ENDIF
col = 33
@  5,col PROMPT " 0. Quit       "    MESSAGE "Return to DOS"
@  6,col PROMPT " 1. Append     "    MESSAGE "Add New Records"
@  7,col PROMPT " 2. Browse     "    MESSAGE "Browse Existing Records"
@  8,col PROMPT " 3. Edit/View  " MESSAGE "View, Change, Delete Records"
@  9,col PROMPT " 4. Help       "    MESSAGE "See System Structure"
@ 10,col PROMPT " 5. Labels     "    MESSAGE "Print Mailing Labels"
@ 11,col PROMPT " 6. Pack       "    MESSAGE "Remove Deleted Records"
@ 12,col PROMPT " 7. Report     "    MESSAGE "Print Report(s)"
@ 13,col PROMPT " 8. Select     "    MESSAGE "Select Database File"
* ---Press <ESC>, <Return>, <PgDn> or the first character "1"..."8".
* ---Assigns 0 (on <ESC>) or 1 thru 8 to menuchoice.
@ 14,COL PROMPT " 9. Keys       " MESSAGE "Set function Keys "
@ 15,COL PROMPT "10. INDEX      " MESSAGE "Reindex Data Base"
MENU TO menuchoice
choice = SUBSTR( "QQABEHLPRSKI",menuchoice + 1,1 )

* ---Release row 18.
SET MESSAGE TO
* ---Save menu selection.
RETURN
* EOF: DOC_MENU.PRG
```

APPENDIX 23

```
* Program.: DOC_OPEN.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: OPEN program for DOCUMENT.DBF
*
* ---INKEY() constant values.
PgDn = CHR(3)
PgUp = CHR(18)
Returnkey = CHR(13)
DelRecord = CHR(7)
Esc = CHR(27)
HOME = CHR(1)
ENDkey = CHR(6)
UParrow = CHR(5)
DOWNarrow = CHR(24)
LEFTarrow = CHR(19)
RIGHTarrow = CHR(4)
*
* ---SET COLOR TO values.
ScreenAtr = "R+/N,N/W"
StatusAtr = "GR/N,N/W"
WindowAtr = "R+/N,N/W"
PromptAtr = "GR+/N,N/W"
HiliteAtr = "N/W"
*
* ---Initialize global variables.
STORE 0 TO LastRec,oldrecnum,recnum,menuchoice
STORE " " TO choice,expr
PromptRow = 23
PromptBar = REPLICATE( CHR( 196 ),80 )
*
* ---Open database file.
SELECT A
IF .NOT. FILE( "DOCUMENT.DBF" )
```

```
      ? ["DOCUMENT.DBF" not found]
      WAIT
      QUIT
ENDIF
USE DOCUMENT
*
* ---Open INDEX file(s).
IF .NOT. FILE( "DOC_BAR.NTX" )
   ? [Creating index "DOC_BAR.NTX"...]
   INDEX ON bar_code TO DOC_BAR.NTX
ENDIF
IF .NOT. FILE( "DOC_PROD.NTX" )
   ? [Creating index "DOC_PROD.NTX"...]
   INDEX ON PROD_NO TO DOC_PROD.NTX
ENDIF
IF .NOT. FILE( "DOC_DATE.NTX" )
   ? [Creating index "DOC_DATE.NTX"...]
   INDEX ON substr(DOC_DATE,7,2)+substr(doc_date,1,2)+substr(doc_date,4,2)
TO
   DOC_DATE.NTX
ENDIF
SET INDEX TO DOC_BAR.NTX,DOC_PROD.NTX,DOC_DATE.NTX
*
* ---Open database file.
SELECT B
IF .NOT. FILE( "PEOPLE.DBF" )
   ? ["PEOPLE.DBF" not found]
   WAIT
   QUIT
ENDIF
USE PEOPLE
*
* ---Open INDEX file(s).
IF .NOT. FILE( "PEO_BAR.NTX" )
   ? [Creating index "PEO_BAR.NTX"...]
   INDEX ON BAR_CODE TO PEO_BAR.NTX
ENDIF
IF .NOT. FILE( "PEOPLE.NTX" )
   ? [Creating index "PEOPLE.NTX"...]
   INDEX ON NAME TO PEOPLE.NTX
ENDIF
SET INDEX TO PEO_BAR.NTX,PEOPLE.NTX
*
* ---Open database file.
SELECT C
IF .NOT. FILE( "DEPO.DBF" )
   ? ["DEPO.DBF" not found]
   WAIT
   QUIT
ENDIF
USE DEPO
*
* ---Open INDEX file(s).
IF .NOT. FILE( "DEPO_BAR.NTX" )
   ? [Creating index "DEPO_BAR.NTX"...]
   INDEX ON BAR_CODE TO DEPO_BAR.NTX
ENDIF
SET INDEX TO DEPO_BAR.NTX
*
* ---Open database file.
SELECT D
IF .NOT. FILE( "DEPO_WIT.DBF" )
   ? ["DEPO_WIT.DBF" not found]
   WAIT
   QUIT
ENDIF
```

```
USE DEPO_WIT
*
* ---Open INDEX file(s).
IF .NOT. FILE( "DEPO_WIT.NTX" )
   ? [Creating index "DEPO_WIT.NTX"...]
   INDEX ON BAR_CODE TO DEPO_WIT.NTX
ENDIF
SET INDEX TO DEPO_WIT.NTX
*
* ---Open database file.
SELECT E
IF .NOT. FILE( "COMMENT.DBF" )
   ? ["COMMENT.DBF" not found]
   WAIT
   QUIT
ENDIF
USE COMMENT
*
* ---Open INDEX file(s).
IF .NOT. FILE( "COM_BAR.NTX" )
   ? [Creating index "COM_BAR.NTX"...]
   INDEX ON BAR_CODE TO COM_BAR.NTX
ENDIF
SET INDEX TO COM_BAR.NTX
*
* ---Open database file.
SELECT F
IF .NOT. FILE( "TRIAL.DBF" )
   ? ["TRIAL.DBF" not found]
   WAIT
   QUIT
ENDIF
USE TRIAL
*
* ---Open INDEX file(s).
IF .NOT. FILE( "TRIAL_BA.NTX" )
   ? [Creating index "TRIAL_BA.NTX"...]
   INDEX ON BAR_CODE TO TRIAL_BA.NTX
ENDIF
IF .NOT. FILE( "TRIAL_EX.NTX" )
   ? [Creating index "TRIAL_EX.NTX"...]
   INDEX ON TRIAL_EXH TO TRIAL_EX.NTX
ENDIF
SET INDEX TO TRIAL_BA.NTX,TRIAL_EX.NTX
*
* ---SET RELATION(s).
SELECT A
SET RELATION TO bar_code INTO PEOPLE,;
   TO BAR_CODE INTO DEPO,;
   TO BAR_CODE INTO COMMENT,;
   TO BAR_CODE INTO TRIAL

SELECT C
SET RELATION TO BAR_CODE INTO DEPO_WIT

*
* ---Open CONDITIONS file.
IF .NOT. FILE( "DOC_COND.DBF" )
   ? [Creating "DOC_COND.DBF" file...]
   COPY TO DOC_XXXX STRUCTURE EXTENDED
   SELECT H
   USE DOC_XXXX
   ZAP
   APPEND BLANK
```

```
        REPLACE FIELD_NAME WITH "CONDEXPR"
        REPLACE FIELD_TYPE WITH "C"
        REPLACE FIELD_LEN  WITH 128
        APPEND BLANK
        REPLACE FIELD_NAME WITH "CONDAREA"
        REPLACE FIELD_TYPE WITH "C"
        REPLACE FIELD_LEN  WITH 1
        USE
        CREATE DOC_COND FROM DOC_XXXX
        DELETE FILE DOC_XXXX.DBF
ENDIF
SELECT H
USE DOC_COND
*
* ---Initialize database variables for current workarea.
DO DOC_AREA
*
RETURN
* EOF: DOC_OPEN.PRG
```

APPENDIX 24

```
* Program.: DOC_PACK.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: PACK driver program for DOCUMENT.DBF
*
PARAMETER row
PRIVATE IsFileOK,filename
@ row,0 SAY "NOT UNDOABLE! - Remove all *DELETED* records? (y/n)"
DO GetKey WITH choice,"YN"+Returnkey
@ row,0 CLEAR
IF choice <> "Y"
    RETURN
ENDIF
CLOSE DATABASES
@ row,0 SAY "Removing all *DELETED* records..."
IsFileOK = .T.
filename = ""
IF NdxOrder > "0"
    filename = NDXnam&NdxOrder
ENDIF
DO DOC_APAC WITH row,DBFname,DBFtemp,filename,IsFileOK
IF IsFileOK
    * ---USE new original and recreate index files.
    USE &DBFname
    @ row,0 CLEAR
    @ row,0 SAY "Recreating index files..."
    SET TALK ON
    DO CASE
    CASE dbfarea = "1"
        INDEX ON &NDXkey1 TO &NDXnam1
        INDEX ON &NDXkey2 TO &NDXnam2
        INDEX ON &NDXkey3 TO &NDXnam3
    CASE dbfarea = "2"
        INDEX ON &NDXkey1 TO &NDXnam1
        INDEX ON &NDXkey2 TO &NDXnam2
    CASE dbfarea = "3"
        INDEX ON &NDXkey1 TO &NDXnam1
    CASE dbfarea = "4"
        INDEX ON &NDXkey1 TO &NDXnam1
    CASE dbfarea = "5"
        INDEX ON &NDXkey1 TO &NDXnam1
    CASE dbfarea = "6"
        INDEX ON &NDXkey1 TO &NDXnam1
```

```
        INDEX ON &NDXkey2 TO &NDXnam2
    ENDCASE
    SET TALK OFF
    * ---Close the datafile and index.
    USE
ENDIF
DO DOC_OPEN
RETURN
* EOF: DOC_PACK.PRG
```

APPENDIX 25

```
* Program.: DOC_PRO1.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: PROCEDURE file for DOCUMENT.DBF
*
****************** WSF
PROCEDURE HELLO
CLEAR
TEXT
```

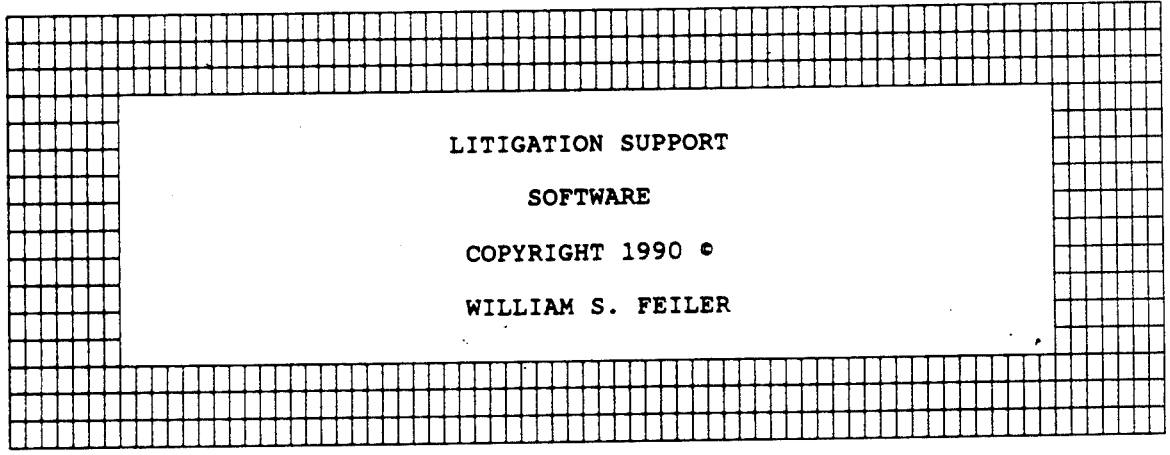

```
ENDTEXT

RETURN

PROCEDURE SETKEYS
* PRG TO SET function  KEYs
set talk off
set delimiter on
CLEAR STORE SPACE(8) TO MSAVE
@ 10,10 SAY 'ENTER FILE NAME TO RESTORE KEYS'
@ 12,10 GET MSAVE
READ
clear
STORE TRIM(MSAVE) TO MSAVE
STORE MSAVE+'.MEM' TO MSAVE
IF FILE ('&MSAVE')
RESTORE FROM &MSAVE additive

***** store memory to expanded
F2 = F2+SPACE(40-LEN(F2))
F3 = F3+SPACE(40-LEN(F3))
F4 = F4+SPACE(40-LEN(F4))
F5 = F5+SPACE(40-LEN(F5))
```

```
F6 = F6+SPACE(40-LEN(F6))
F7 = F7+SPACE(40-LEN(F7))
F8 = F8+SPACE(40-LEN(F8))
F9 = F9+SPACE(40-LEN(F9))
F10= F10+SPACE(40-LEN(F10))

ELSE
@ 14,0 SAY 'FILE '+MSAVE+' NOT FOUND'
WAIT
CLEAR
******
STORE SPACE(40) TO F2
STORE SPACE(40) TO F3
STORE SPACE(40) TO F4
STORE SPACE(40) TO F5
STORE SPACE(40) TO F6
STORE SPACE(40) TO F7
STORE SPACE(40) TO F8
STORE SPACE(40) TO F9
STORE SPACE(40) TO F10

******
ENDIF
clear
@ 0,0 SAY 'ENTER COMMANDS TO FUNCTION KEYS'

@1,0 SAY '      FUNCTION KEYS'
@2,0 SAY 'F2=  ' GET F2
@ROW()+1,0 SAY 'F3=  ' GET F3
@ROW()+1,0 SAY 'F4=  ' GET F4
@ROW()+1,0 SAY 'F5=  ' GET F5
@ROW()+1,0 SAY 'F6=  ' GET F6
@ROW()+1,0 SAY 'F7=  ' GET F7
@ROW()+1,0 SAY 'F8=  ' GET F8
@ROW()+1,0 SAY 'F9=  ' GET F9
@ROW()+1,0 SAY 'F10= ' GET F10
READ
******
STORE TRIM(F2) TO F2
STORE TRIM(F3) TO F3
STORE TRIM(F4) TO F4
STORE TRIM(F5) TO F5
STORE TRIM(F6) TO F6
STORE TRIM(F7) TO F7
STORE TRIM(F8) TO F8
STORE TRIM(F9) TO F9
STORE TRIM(F10) TO F10

*****

SET FUNCTION 2 TO '&F2'
SET FUNCTION 3 TO '&F3'
SET FUNCTION 4 TO '&F4'
SET FUNCTION 5 TO '&F5'
SET FUNCTION 6 TO '&F6'
SET FUNCTION 7 TO '&F7'
SET FUNCTION 8 TO '&F8'
SET FUNCTION 9 TO '&F9'
SET FUNCTION 10 TO '&F10'

CLEAR

WAIT 'DO YOU WISH TO SAVE THE KEY SETUP ? [Y/N]' TO CHOICE
IF UPPER(CHOICE)= 'Y'
CLEAR
```

```
STORE SPACE(8) TO MSAVE1
@ 10,10 SAY 'ENTER FILE NAME TO SAVE TO'GET MSAVE1
READ
STORE TRIM(MSAVE1)+'.MEM' TO MSAVE1
SAVE all like f?? TO &MSAVE1
RESTORE FROM &MSAVE additive ENDIF
set delimiter off
clear

RETURN

*******************
PROCEDURE SayRec
   * ---"SayRec" is used by the EDIT program and PROCEDURE DoCONT.
   *
   DO StatLine WITH RECNO(),DELETED()
   SELECT A
   DO DOC_ASAY
   SELECT B
   DO DOC_BSAY
   SELECT C
   DO DOC_CSAY
   SELECT D
   DO DOC_DSAY
   SELECT E
   DO DOC_ESAY
   SELECT F
   DO DOC_FSAY
   SELECT &dbfarea
   *
   * ---If you are calling "SayRec" from more than one
   * ---application, you may wish to replace the above
   * ---line with a DO CASE structure, as follows:
   *
   *     * ---"appnum" is the application ID number.
   *     DO CASE
   *     CASE appnum = 1
   *        DO AP1_SAYS
   *     CASE appnum = 2
   *        DO AP2_SAYS
   *     ENDCASE
   *
RETURN PROCEDURE GetKey
PARAMETER choice,keychars
PRIVATE keycode
   choice = "*"
   DO WHILE .NOT. (choice $ keychars)
      keycode = INKEY()
      IF keycode > 0
         choice = UPPER(CHR(keycode))
      ENDIF
      * ---A keyfilter can be implemented here, as follows:
      *
      *     * ---FROM:  {F1}  ^leftarrow  ^rightarrow
      *     * ---INTO:  "H"    leftarrow   rightarrow
      *     fromkeys = CHR(28) + CHR(26) + CHR(2)
      *     intokeys = "H" + CHR(19) + CHR(4)
      *     choice = SUBSTR( "*"+intokeys,AT(choice,fromkeys) + 1,1 )
   ENDDO
RETURN
```

```
PROCEDURE StatLine
PARAMETER recnum,IsDeleted
    SET COLOR TO &StatusAtr
    @ 0, 8 SAY SUBSTR( STR( recnum + 1000000,7 ),2 )
    @ 0,29 SAY "<          >"
    @ 0,30 SAY SUBSTR( DBFname,1,AT( ".",DBFname )-1 )
    @ 0,50 SAY IIF( IsDeleted,"*DELETED*",SPACE(9) )
RETURN PROCEDURE SayEOF
PARAMETER row,oldrecnum
    SET COLOR TO &PromptAtr
    @ row,0 CLEAR
    IF EOF()
        @ row,0 SAY "END-OF-FILE encountered"
    ELSE
        @ row,0 SAY "BEGINNING-OF-FILE encountered"
    ENDIF
    WAIT
    @ row,0 CLEAR
    IF oldrecnum > 0
        GOTO oldrecnum
    ENDIF
RETURN PROCEDURE SayLine
PARAMETER row,strg
    SET COLOR TO &PromptAtr
    @ row,0 CLEAR
    @ row,0 SAY strg
RETURN
PROCEDURE GotoRec
PARAMETER row,recnum,lastrecnum
    recnum = 0
    SET COLOR TO &PromptAtr
    @ row,0 CLEAR
    @ row+1,17 SAY "{ 1 to "
    @ row+1,24 SAY SUBSTR( STR( lastrecnum + 1000000,7 ),2 ) + " } +
{Return}"
    @ row,0 SAY "Enter RECORD number" GET recnum;
            PICTURE "@Z 9999999" RANGE 0,lastrecnum
    READ
    @ row,0 CLEAR
    IF recnum > 0
        GOTO recnum
    ENDIF
RETURN PROCEDURE DoGOTO
PARAMETER row,recnum,lastrecnum
    recnum = 0
    SET COLOR TO &PromptAtr
    @ row,0 CLEAR
    menuchoice = 4
    @ row,0 SAY "GOTO:"
    @ row, 7 PROMPT "Top"
    @ row,12 PROMPT "Bottom"
    @ row,20 PROMPT "Number"
    @ row,28 PROMPT "Return"
    MENU TO menuchoice
    choice = SUBSTR( Returnkey+"TBR"+Returnkey,menuchoice + 1,1 )
    @ row,0 CLEAR
    DO CASE
    CASE choice = Returnkey
```

```
      RETURN
   CASE choice = "T"
      GOTO TOP
      recnum = RECNO()
   CASE choice = "B"
      GOTO BOTTOM
      recnum = RECNO()
   CASE choice = "R"
      DO GotoRec WITH row,recnum,lastrecnum
   ENDCASE
RETURN PROCEDURE DoLOCATE
PARAMETER row,expr
PRIVATE oldrecnum
   oldrecnum = RECNO()
   DO SayLine WITH row,"Locating..."
   LOCATE FOR &expr
   IF EOF()
      DO SayEOF WITH row,oldrecnum
   ELSE
      @ row,0 CLEAR
      @ row,0 SAY "LOCATE FOR" GET expr
      CLEAR GETS
      DO DoCONT WITH row
   ENDIF
RETURN PROCEDURE DoCONT
PARAMETER row
PRIVATE oldrecnum
   choice = "Y"
   DO WHILE choice = "Y" .AND. .NOT. EOF()
      oldrecnum = RECNO()
      DO SayRec
      DO SayLine WITH row+1,"Continue? (y/n)"
      DO GetKey WITH choice,"YN"+Returnkey
      @ row+1,0 CLEAR
      IF choice = "Y"
         CONTINUE
      ENDIF
   ENDDO
   IF EOF()
      DO SayEOF WITH row,oldrecnum
   ENDIF
RETURN FUNCTION PausePRN
PARAMETER isprinter
   IF INKEY() = 0    && No key was pressed.
      RETURN .T.    && Printing continues WHILE .T.
   ENDIF
   * ---A key was pressed.
   PRIVATE choice,crow,numRECS
   SET ESCAPE OFF
   choice = "*"
   crow = ROW()
   DO SayLine WITH crow,;
      "PAUSED!  <Return>:continue  {B}ackup-and-continue  {Q}uit "
   DO GetKey WITH choice,"BQ"+Returnkey
   @ crow,0 CLEAR
   IF choice = "B"
      * ---Backup and continue.
      numRECS = 0
```

```
        @ crow,0 CLEAR
        @ crow,0 SAY "Enter number of records to backup";
            GET numRECS PICTURE "@Z 999" RANGE 0,999
      READ
      @ crow,0 CLEAR
      IF numRECS > 0
         SKIP -numRECS
      ENDIF
      IF isprinter
         EJECT
      ELSE
         CLEAR
      ENDIF
   ENDIF
   SET ESCAPE ON
   * ---Quit report when "Q" is pressed (RETURN .F.).
RETURN (choice <> "Q")

* EOF: DOC_PRO1.PRG
```

APPENDIX 26

```
* Program.: DOC_PRO2.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: Second PROCEDURE file for DOCUMENT.DBF
*

PROCEDURE DOC_AREA
   * ---Expects "dbfarea" to be initialized
   * ---prior to this procedure being called.
   SELECT &dbfarea
   DO CASE
   CASE dbfarea = "1"
      DBFname = "DOCUMENT.DBF"
      DBFtemp = "DOCUMEN$.DBF"
      NDXnam1 = "DOC_BAR.NTX"
      NDXkey1 = "bar_code"
      NDXnam2 = "DOC_PROD.NTX"
      NDXkey2 = "PROD_NO"
      NDXnam3 = "DOC_DATE.NTX"
      NDXkey3 =
"substr(DOC_DATE,7,2)+substr(doc_date,1,2)+substr(doc_date,4,2)"
      NdxOrder = "1"
      NdxTotal = 3
   CASE dbfarea = "2"
      DBFname = "PEOPLE.DBF"
      DBFtemp = "PEOPLE$.DBF"
      NDXnam1 = "PEO_BAR.NTX"
      NDXkey1 = "BAR_CODE"
      NDXnam2 = "PEOPLE.NTX"
      NDXkey2 = "NAME"
      NdxOrder = "1"
      NdxTotal = 2
   CASE dbfarea = "3"
      DBFname = "DEPO.DBF"
      DBFtemp = "DEPO$.DBF"
      NDXnam1 = "DEPO_BAR.NTX"
      NDXkey1 = "BAR_CODE"
      NdxOrder = "1"
      NdxTotal = 1
   CASE dbfarea = "4"
      DBFname = "DEPO_WIT.DBF"
      DBFtemp = "DEPO_WI$.DBF"
      NDXnam1 = "DEPO_WIT.NTX"
```

```
      NDXkey1 = "BAR_CODE"
      NdxOrder = "1"
      NdxTotal = 1
   CASE dbfarea = "5"
      DBFname = "COMMENT.DBF"
      DBFtemp = "COMMENT$.DBF"
      NDXnam1 = "COM_BAR.NTX"
      NDXkey1 = "BAR_CODE"
      NdxOrder = "1"
      NdxTotal = 1
   CASE dbfarea = "6"
      DBFname = "TRIAL.DBF"
      DBFtemp = "TRIAL$.DBF"
      NDXnam1 = "TRIAL_BA.NTX"
      NDXkey1 = "BAR_CODE"
      NDXnam2 = "TRIAL_EX.NTX"
      NDXkey2 = "TRIAL_EXH"
      NdxOrder = "1"
      NdxTotal = 2
   ENDCASE
   LastRec = RECCOUNT()
RETURN PROCEDURE DOC_FILE
PARAMETER row,dbfchoice
   SET COLOR TO &PromptAtr
   @ row,0 CLEAR
   @ row+1,0 SAY "          6-TRIAL "
   @ row,0 SAY "SELECT:  1-DOCUMENT  2-PEOPLE  3-DEPO  4-DEPO_WIT  5-COMMENT "
   DO GetKey WITH dbfchoice,"123456"+Returnkey
   IF dbfchoice = Returnkey
      RETURN
   ENDIF
   dbfarea = dbfchoice
   DO DOC_AREA
RETURN PROCEDURE DOC_ANDX
PARAMETER row,ndxchoice
   SET COLOR TO &PromptAtr
   @ row,0 CLEAR
   @ row,0 SAY "SET INDEX:  1-DOC_BAR  2-DOC_PROD  3-DOC_DATE "
   DO GetKey WITH ndxchoice,"123"+Returnkey
   IF ndxchoice = Returnkey
      RETURN
   ENDIF
   NdxOrder = ndxchoice
   SET ORDER TO &NdxOrder
RETURN PROCEDURE DOC_BNDX
PARAMETER row,ndxchoice
   SET COLOR TO &PromptAtr
   @ row,0 CLEAR
   @ row,0 SAY "SET INDEX:  1-PEO_BAR  2-PEOPLE "
   DO GetKey WITH ndxchoice,"12"+Returnkey
   IF ndxchoice = Returnkey
      RETURN
   ENDIF
   NdxOrder = ndxchoice
   SET ORDER TO &NdxOrder
RETURN
```

```
PROCEDURE DOC_FNDX
PARAMETER row,ndxchoice
   SET COLOR TO &PromptAtr
   @ row,0 CLEAR
   @ row,0 SAY "SET INDEX:  1-TRIAL_BA  2-TRIAL_EX "
   DO GetKey WITH ndxchoice,"12"+Returnkey
   IF ndxchoice = Returnkey
      RETURN
   ENDIF
   NdxOrder = ndxchoice
   SET ORDER TO &NdxOrder
RETURN PROCEDURE DOC_NDXS
PARAMETER row,ndxchoice
   DO CASE
   CASE dbfarea = "1"
      DO DOC_ANDX WITH row,ndxchoice
   CASE dbfarea = "2"
      DO DOC_BNDX WITH row,ndxchoice
   CASE dbfarea = "3"
      * ---Only one index.
      ndxchoice = "1"
   CASE dbfarea = "4"
      * ---Only one index.
      ndxchoice = "1"
   CASE dbfarea = "5"
      * ---Only one index.
      ndxchoice = "1"
   CASE dbfarea = "6"
      DO DOC_FNDX WITH row,ndxchoice
   ENDCASE
RETURN PROCEDURE DOC_ASEE
PARAMETER row
PRIVATE expr
   SET COLOR TO &PromptAtr
   @ row,0 CLEAR
   DO CASE
   CASE NdxOrder = "1"
      mBar_code = SPACE(15)
      @ row,  0 SAY "Enter Bar_code" GET mBar_code
      READ
      expr = TRIM( MBAR_CODE )
      IF "" <> expr
         SEEK expr
      ENDIF
   CASE NdxOrder = "2"
      mProd_no = SPACE(15)
      @ row,  0 SAY "Enter Prod_no" GET mProd_no
      READ
      expr = TRIM( MPROD_NO )
      IF "" <> expr
         SEEK expr
      ENDIF
   CASE NdxOrder = "3"
      mDoc_date = SPACE(8)
      @ row,  0 SAY "Enter Doc_date" GET mDoc_date PICTURE "99/99/99"
      READ
      expr = TRIM( SUBSTR(MDOC_DATE,7,2)+SUBSTR(MDOC_DATE,1,2)+SUBSTR(MDOC_DATE,4,2) )
      IF "" <> expr
         SEEK expr
```

```
      ENDIF
   ENDCASE
RETURN

PROCEDURE DOC_BSEE
PARAMETER row
PRIVATE expr
   SET COLOR TO &PromptAtr
   @ row,0 CLEAR
   DO CASE
   CASE NdxOrder = "1"
      mBAR_CODE = SPACE(15)
      @ row,  0 SAY "Enter BAR_CODE" GET mBAR_CODE
      READ
      expr = TRIM( MBAR_CODE )
      IF "" <> expr
         SEEK expr
      ENDIF
   CASE NdxOrder = "2"
      mNAME = SPACE(30)
      @ row,  0 SAY "Enter NAME" GET mNAME
      READ
      expr = TRIM( MNAME )
      IF "" <> expr
         SEEK expr
      ENDIF
   ENDCASE
RETURN PROCEDURE DOC_CSEE
PARAMETER row
PRIVATE expr
   SET COLOR TO &PromptAtr
   @ row,0 CLEAR
   DO CASE
   CASE NdxOrder = "1"
      mBAR_CODE = SPACE(15)
      @ row,  0 SAY "Enter BAR_CODE" GET mBAR_CODE
      READ
      expr = TRIM( MBAR_CODE )
      IF "" <> expr
         SEEK expr
      ENDIF
   ENDCASE
RETURN PROCEDURE DOC_DSEE
PARAMETER row
PRIVATE expr
   SET COLOR TO &PromptAtr
   @ row,0 CLEAR
   DO CASE
   CASE NdxOrder = "1"
      mBAR_CODE = SPACE(15)
      @ row,  0 SAY "Enter BAR_CODE" GET mBAR_CODE
      READ
      expr = TRIM( MBAR_CODE )
      IF "" <> expr
         SEEK expr
      ENDIF
   ENDCASE
RETURN
```

```
PROCEDURE DOC_ESEE
PARAMETER row
PRIVATE expr
   SET COLOR TO &PromptAtr
   @ row,0 CLEAR
   DO CASE
   CASE NdxOrder = "1"
      mBAR_CODE = SPACE(15)
      @ row,  0 SAY "Enter BAR_CODE" GET mBAR_CODE
      READ
      expr = TRIM( MBAR_CODE )
      IF "" <> expr
         SEEK expr
      ENDIF
   ENDCASE
RETURN PROCEDURE DOC_FSEE
PARAMETER row
PRIVATE expr
   SET COLOR TO &PromptAtr
   @ row,0 CLEAR
   DO CASE
   CASE NdxOrder = "1"
      mBAR_CODE = SPACE(15)
      @ row,  0 SAY "Enter BAR_CODE" GET mBAR_CODE
      READ
      expr = TRIM( MBAR_CODE )
      IF "" <> expr
         SEEK expr
      ENDIF
   CASE NdxOrder = "2"
      mTRIAL_EXH = SPACE(15)
      @ row,  0 SAY "Enter TRIAL_EXH" GET mTRIAL_EXH
      READ
      expr = TRIM( MTRIAL_EXH )
      IF "" <> expr
         SEEK expr
      ENDIF
   ENDCASE
RETURN PROCEDURE DOC_SEEK
PARAMETER row
   IF NdxOrder = "0"
      RETURN
   ENDIF
   DO CASE
   CASE dbfarea = "1"
      DO DOC_ASEE WITH row
   CASE dbfarea = "2"
      DO DOC_BSEE WITH row
   CASE dbfarea = "3"
      DO DOC_CSEE WITH row
   CASE dbfarea = "4"
      DO DOC_DSEE WITH row
   CASE dbfarea = "5"
      DO DOC_ESEE WITH row
   CASE dbfarea = "6"
      DO DOC_FSEE WITH row
   ENDCASE
RETURN
```

```
PROCEDURE DOC_FORM
   SET COLOR TO &ScreenAtr
   CLEAR
   SET COLOR TO &StatusAtr
   @  0, 0 SAY SPACE(80)
   @  0, 0 SAY "Record:"
   @  0,72 SAY DATE()
   SET COLOR TO &PromptAtr
   @ PromptRow-1,0 SAY PromptBar
   *
   SET COLOR TO R+/N
   @ 1,0 TO 14,79 DOUBLE
   @  2, 2 SAY "Bar_code   "
   @  2,28 SAY "Prod_no    "
   @  2,54 SAY "Prod_noend"
   @  3, 2 SAY "Source     "
   @  3,28 SAY "Masked     "
   @  3,54 SAY "In_margin "
   @  4, 2 SAY "Doc_type   "
   @  4,28 SAY "Doc_date   "
   @  4,54 SAY "Total_page"
   @  5, 2 SAY "Rating     "
   @  5,13 SAY "[ ,0,1,2,3]"
   @  5,28 SAY "Duplicates"
   @  5,66 SAY "Confid     "
   @  6, 2 SAY "Descript   "
   @  6,66 SAY "Tag        "
   @  7, 2 SAY "Key_word   "
   @  7,66 SAY "Prior_art "
   @  8, 2 SAY "Flag_1     "
   @  8,17 SAY "  Flag_2   "
   @  8,32 SAY "  Flag_3   "
   @  8,48 SAY "  Flag_4   "
   @  8,64 SAY "  Flag_5   "
   @  9, 2 SAY "Producedto"
   @  9,32 SAY "Immunity  "
   @  9,52 SAY "[  ,A/C,A/C W/P,W/P]"
   @ 10, 2 SAY "BAR_CODE"
   @ 10,18 SAY "ACTION[AUTH,ADDR,COPY]"
   @ 10,41 SAY "  NAME"
   @ 10,67 SAY "NAME_FIRM"
   @ 12, 2 SAY "BAR_CODE"
   @ 12,18 SAY "              RELEVANCE/COMMENT"
   @ 12,69 SAY "PROD_NO"
   @ 15,0,21,40 BOX "  |J=L|"
   @ 15,41,21,79 BOX "  |J=L|"
   @ 16,10 SAY "DEPOSITION INFORMATION"
   @ 16,56 SAY "TRIAL "
   @ 17, 2 SAY "DEPO_EXH"
   @ 18, 2 SAY "BAR_CODE"
   @ 18,25 SAY "[MARK,ASK,AUTH]"
   @ 19, 2 SAY "BAR_CODE"
   @ 19,26 SAY "ACTION   "
   @ 20, 2 SAY "WITNESS "
   @ 16,43 SAY "BAR_CODE "
   @ 16,63 SAY "  TRIAL_EXH"
   @ 18,43 SAY "WITNESS   "
   @ 19,43 SAY "OBJECTION "
   @ 20,43 SAY "OFFER_ADM "
RETURN
PROCEDURE DOC_KEYS
PARAMETER expr,IsBlank,IsUnique
   expr = ""
   IsBlank = .F.
   IsUnique = .F.
   DO CASE
   CASE dbfarea = "1"
```

```
            SET COLOR TO ,N/W
            @  2,12 GET mBar_code
            READ
            IsBlank = ("" = TRIM( mBar_code ))
            expr = MBAR_CODE
            IsUnique = .F.
         CASE dbfarea = "2"
            SET COLOR TO ,N/W
            @ 11, 2 GET mBAR_CODE
            READ
            IsBlank = ("" = TRIM( mBAR_CODE ))
            expr = MBAR_CODE
            IsUnique = .F.
         CASE dbfarea = "3"
            SET COLOR TO ,N/W
            @ 18,10 GET mBAR_CODE
            READ
            IsBlank = ("" = TRIM( mBAR_CODE ))
            expr = MBAR_CODE
            IsUnique = .F.
         CASE dbfarea = "4"
            SET COLOR TO ,N/W
            @ 19,10 GET mBAR_CODE
            READ
            IsBlank = ("" = TRIM( mBAR_CODE ))
            expr = MBAR_CODE
            IsUnique = .F.
         CASE dbfarea = "5"
            SET COLOR TO ,N/W
            @ 13, 2 GET mBAR_CODE
            READ
            IsBlank = ("" = TRIM( mBAR_CODE ))
            expr = MBAR_CODE
            IsUnique = .F.
         CASE dbfarea = "6"
            SET COLOR TO ,N/W
            @ 17,43 GET mBAR_CODE
            READ
            IsBlank = ("" = TRIM( mBAR_CODE ))
            expr = MBAR_CODE
            IsUnique = .F.
      ENDCASE
RETURN PROCEDURE DOC_INIT
    * ---Initialize fields/memvars.
    DO CASE
    CASE dbfarea = "1"
       * ---<none>.
    CASE dbfarea = "2"
       * ---<none>.
    CASE dbfarea = "3"
       * ---<none>.
    CASE dbfarea = "4"
       * ---<none>.
    CASE dbfarea = "5"
       * ---<none>.
    CASE dbfarea = "6"
       * ---<none>.
    ENDCASE
RETURN
PROCEDURE DOC_SAYS
    DO CASE
    CASE dbfarea = "1"
       DO DOC_ASAY
    CASE dbfarea = "2"
```

```
         DO DOC_BSAY
      CASE dbfarea = "3"
         DO DOC_CSAY
      CASE dbfarea = "4"
         DO DOC_DSAY
      CASE dbfarea = "5"
         DO DOC_ESAY
      CASE dbfarea = "6"
         DO DOC_FSAY
      ENDCASE
RETURN PROCEDURE DOC_GETS
   DO CASE
      CASE dbfarea = "1"
         DO DOC_AGET
      CASE dbfarea = "2"
         DO DOC_BGET
      CASE dbfarea = "3"
         DO DOC_CGET
      CASE dbfarea = "4"
         DO DOC_DGET
      CASE dbfarea = "5"
         DO DOC_EGET
      CASE dbfarea = "6"
         DO DOC_FGET
      ENDCASE
RETURN PROCEDURE DOC_STOR
   DO CASE
      CASE dbfarea = "1"
         DO DOC_ASTO
      CASE dbfarea = "2"
         DO DOC_BSTO
      CASE dbfarea = "3"
         DO DOC_CSTO
      CASE dbfarea = "4"
         DO DOC_DSTO
      CASE dbfarea = "5"
         DO DOC_ESTO
      CASE dbfarea = "6"
         DO DOC_FSTO
      ENDCASE
RETURN PROCEDURE DOC_REPL
   DO CASE
      CASE dbfarea = "1"
         DO DOC_AREP
      CASE dbfarea = "2"
         DO DOC_BREP
      CASE dbfarea = "3"
         DO DOC_CREP
      CASE dbfarea = "4"
         DO DOC_DREP
      CASE dbfarea = "5"
         DO DOC_EREP
      CASE dbfarea = "6"
         DO DOC_FREP
      ENDCASE
RETURN
```

```
PROCEDURE DOC_ASAY
    * ---Using DOCUMENT.DBF
    SET COLOR TO ,N/W
    @ 2,12 GET Bar_code
    @ 2,38 GET Prod_no
    @ 2,64 GET Prod_noend
    @ 3,12 GET Source
    @ 3,38 GET Masked     PICTURE "L"
    @ 3,64 GET In_margin  PICTURE "L"
    @ 4,12 GET Doc_type
    @ 4,38 GET Doc_date   PICTURE "99/99/99"
    @ 4,64 GET Total_page PICTURE "9999"
    @ 5,12 GET Rating     PICTURE "9"
    @ 5,38 GET Duplicates
    @ 5,76 GET Confid     PICTURE "L"
    @ 6,12 GET Descript
    @ 6,76 GET Tag
    @ 7,12 GET Key_word
    @ 7,76 GET Prior_art
    @ 8,12 GET Flag_1
    @ 8,27 GET Flag_2
    @ 8,42 GET Flag_3
    @ 8,58 GET Flag_4
    @ 8,74 GET Flag_5
    @ 9,12 GET Producedto
    @ 9,42 GET Immunity   PICTURE "@!"
    CLEAR GETS
RETURN PROCEDURE DOC_BSAY
    * ---Using PEOPLE.DBF
    SET COLOR TO ,N/W
    @ 11, 2 GET BAR_CODE
    @ 11,21 GET ACTION
    @ 11,32 GET NAME
    @ 11,67 GET NAME_FIRM
    CLEAR GETS
RETURN PROCEDURE DOC_CSAY
    * ---Using DEPO.DBF
    SET COLOR TO ,N/W
    @ 17,10 GET DEPO_EXH
    @ 18,10 GET BAR_CODE
    CLEAR GETS
RETURN PROCEDURE DOC_DSAY
    * ---Using DEPO_WIT.DBF
    SET COLOR TO ,N/W
    @ 19,10 GET BAR_CODE
    @ 19,34 GET ACTION
    @ 20,10 GET WITNESS
    CLEAR GETS
RETURN PROCEDURE DOC_ESAY
    * ---Using COMMENT.DBF
    SET COLOR TO ,N/W
    @ 13, 2 GET BAR_CODE
    @ 13,18 GET COMMENT
    @ 13,69 GET PROD_NO   PICTURE "@S9"
    CLEAR GETS
RETURN
```

```
PROCEDURE DOC_FSAY
    * ---Using TRIAL.DBF
    SET COLOR TO ,N/W
    @ 17,43 GET BAR_CODE
    @ 17,63 GET TRIAL_EXH
    @ 18,53 GET WITNESS     PICTURE "@S20"
    @ 19,53 GET OBJECTION   PICTURE "@S20"
    @ 20,53 GET OFFER_ADM   PICTURE "@S20"
    CLEAR GETS
RETURN PROCEDURE DOC_AGET
    * ---Using DOCUMENT.DBF
    SET COLOR TO ,N/W
    @ 2,38 GET mProd_no
    @ 2,64 GET mProd_noen
    @ 3,12 GET mSource
    @ 3,38 GET mMasked      PICTURE "L" VALID(UPPER(MMASKED) $ ' ,Y,N,T,F')
    @ 3,64 GET mIn_margin   PICTURE "L" VALID(UPPER(MIN_MARGIN) $ ' ,Y,N,T,F')
    @ 4,12 GET mDoc_type
    @ 4,38 GET mDoc_date    PICTURE "99/99/99"
    @ 4,64 GET mTotal_pag   PICTURE "9999"
    @ 5,12 GET mRating      PICTURE "9" VALID(MRATING $ ' ,0,1,2,3')
    @ 5,38 GET mDuplicate
    @ 5,76 GET mConfid      PICTURE "L" VALID(UPPER(MCONFID) $ ' ,T,F,Y,N')
    @ 6,12 GET mDescript
    @ 6,76 GET mTag
    @ 7,12 GET mKey_word
    @ 7,76 GET mPrior_art
    @ 8,12 GET mFlag_1
    @ 8,27 GET mFlag_2
    @ 8,42 GET mFlag_3
    @ 8,58 GET mFlag_4
    @ 8,74 GET mFlag_5
    @ 9,12 GET mProducedt
    @ 9,42 GET mImmunity    PICTURE "@!" VALID(MIMMUNITY $ "        ,A/C
,A/C        W/P  ,     W/P      ")
    READ
RETURN PROCEDURE DOC_BGET
    * ---Using PEOPLE.DBF
    SET COLOR TO ,N/W
    @ 11,21 GET mACTION     VALID(UPPER(MACTION) $ ',     ,AUTH,ADDR,COPY')
    @ 11,32 GET mNAME
    @ 11,67 GET mNAME_FIRM
    READ
RETURN PROCEDURE DOC_CGET
    * ---Using DEPO.DBF
    SET COLOR TO ,N/W
    @ 17,10 GET mDEPO_EXH
    READ
RETURN PROCEDURE DOC_DGET
    * ---Using DEPO_WIT.DBF
    SET COLOR TO ,N/W
    @ 19,34 GET mACTION     VALID(UPPER(MACTION) $ '     ,ASK ,MARK,AUTH')
    @ 20,10 GET mWITNESS
    READ
RETURN
```

```
PROCEDURE DOC_EGET
    * ---Using COMMENT.DBF
    SET COLOR TO ,N/W
    @ 13,18 GET mCOMMENT
    @ 13,69 GET mPROD_NO    PICTURE "@S9"
    READ
RETURN PROCEDURE DOC_FGET
    * ---Using TRIAL.DBF
    SET COLOR TO ,N/W
    @ 17,63 GET mTRIAL_EXH
    @ 18,53 GET mWITNESS    PICTURE "@S20"
    @ 19,53 GET mOBJECTION  PICTURE "@S20"
    @ 20,53 GET mOFFER_ADM  PICTURE "@S20"
    READ
RETURN PROCEDURE DOC_ASTO
    * ---Using DOCUMENT.DBF
    * ---Initialize memvars with field contents.
    STORE Bar_code    TO mBar_code
    STORE Prod_no     TO mProd_no
    STORE Prod_noend  TO mProd_noen
    STORE Source      TO mSource
    STORE Masked      TO mMasked
    STORE In_margin   TO mIn_margin
    STORE Doc_type    TO mDoc_type
    STORE Doc_date    TO mDoc_date
    STORE Total_page  TO mTotal_pag
    STORE Rating      TO mRating
    STORE Duplicates  TO mDuplicate
    STORE Confid      TO mConfid
    STORE Descript    TO mDescript
    STORE Tag         TO mTag
    STORE Key_word    TO mKey_word
    STORE Prior_art   TO mPrior_art
    STORE Flag_1      TO mFlag_1
    STORE Flag_2      TO mFlag_2
    STORE Flag_3      TO mFlag_3
    STORE Flag_4      TO mFlag_4
    STORE Flag_5      TO mFlag_5
    STORE Producedto  TO mProducedt
    STORE Immunity    TO mImmunity
RETURN PROCEDURE DOC_BSTO
    * ---Using PEOPLE.DBF
    * ---Initialize memvars with field contents.
    STORE BAR_CODE    TO mBAR_CODE
    STORE ACTION      TO mACTION
    STORE NAME        TO mNAME
    STORE NAME_FIRM   TO mNAME_FIRM
RETURN PROCEDURE DOC_CSTO
    * ---Using DEPO.DBF
    * ---Initialize memvars with field contents.
    STORE DEPO_EXH    TO mDEPO_EXH
    STORE BAR_CODE    TO mBAR_CODE
RETURN
```

```
PROCEDURE DOC_DSTO
    * ---Using DEPO_WIT.DBF
    * ---Initialize memvars with field contents.
    STORE BAR_CODE   TO mBAR_CODE
    STORE ACTION     TO mACTION
    STORE WITNESS    TO mWITNESS
RETURN PROCEDURE DOC_ESTO
    * ---Using COMMENT.DBF
    * ---Initialize memvars with field contents.
    STORE BAR_CODE   TO mBAR_CODE
    STORE COMMENT    TO mCOMMENT
    STORE PROD_NO    TO mPROD_NO
RETURN PROCEDURE DOC_FSTO
    * ---Using TRIAL.DBF
    * ---Initialize memvars with field contents.
    STORE BAR_CODE   TO mBAR_CODE
    STORE TRIAL_EXH  TO mTRIAL_EXH
    STORE WITNESS    TO mWITNESS
    STORE OBJECTION  TO mOBJECTION
    STORE OFFER_ADM  TO mOFFER_ADM
RETURN PROCEDURE DOC_AREP
    * ---Using DOCUMENT.DBF
    REPLACE;
        Bar_code    WITH mBar_code,;
        Prod_no     WITH mProd_no,;
        Prod_noend  WITH mProd_noen,;
        Source      WITH mSource,;
        Masked      WITH mMasked,;
        In_margin   WITH mIn_margin,;
        Doc_type    WITH mDoc_type
    REPLACE;
        Doc_date    WITH mDoc_date,;
        Total_page  WITH mTotal_pag,;
        Rating      WITH mRating,;
        Duplicates  WITH mDuplicate,;
        Confid      WITH mConfid,;
        Descript    WITH mDescript,;
        Tag         WITH mTag
    REPLACE;
        Key_word    WITH mKey_word,;
        Prior_art   WITH mPrior_art,;
        Flag_1      WITH mFlag_1,;
        Flag_2      WITH mFlag_2,;
        Flag_3      WITH mFlag_3,;
        Flag_4      WITH mFlag_4,;
        Flag_5      WITH mFlag_5
    REPLACE;
        Producedto  WITH mProducedt,;
        Immunity    WITH mImmunity
RETURN PROCEDURE DOC_BREP
    * ---Using PEOPLE.DBF
    REPLACE;
        BAR_CODE    WITH mBAR_CODE,;
        ACTION      WITH mACTION,;
```

```
        NAME        WITH mNAME,;
        NAME_FIRM   WITH mNAME_FIRM
RETURN

PROCEDURE DOC_CREP
    * ---Using DEPO.DBF
    REPLACE;
        DEPO_EXH    WITH mDEPO_EXH,;
        BAR_CODE    WITH mBAR_CODE
RETURN
PROCEDURE DOC_DREP
    * ---Using DEPO_WIT.DBF
    REPLACE;
        BAR_CODE    WITH mBAR_CODE,;
        ACTION      WITH mACTION,;
        WITNESS     WITH mWITNESS
RETURN PROCEDURE DOC_EREP
    * ---Using COMMENT.DBF
    REPLACE;
        BAR_CODE    WITH mBAR_CODE,;
        COMMENT     WITH mCOMMENT,;
        PROD_NO     WITH mPROD_NO
RETURN PROCEDURE DOC_FREP
    * ---Using TRIAL.DBF
    REPLACE;
        BAR_CODE    WITH mBAR_CODE,;
        TRIAL_EXH   WITH mTRIAL_EXH,;
        WITNESS     WITH mWITNESS,;
        OBJECTION   WITH mOBJECTION,;
        OFFER_ADM   WITH mOFFER_ADM
RETURN

* EOF: DOC_PRO2.PRG
```

APPENDIX 27

```
* Program.: DOC_REPO.PRG
* Author..: WILLIAM S. FEILER
* Date....: 04/01/90
* Notice..: Copyright © 1990, WILLIAM S. FEILER, All Rights Reserved
* Version.: Clipper, Summer 1987
* Notes...: REPORT program for DOCUMENT.DBF
*
PRIVATE filename,savrecnum,isprinter,ndxchoice
*
savrecnum = RECNO()
SET COLOR TO &ScreenAtr
CLEAR
@ 0, 0 SAY "P R I N T    R E P O R T"
@ 0,72 SAY DATE()
@ 1, 0 SAY PromptBar
* ---Display report forms.
@ 5, 0 SAY REPLICATE( CHR(22),80 )
@ 6, 0 SAY "Directory of DOC_*.FRM"
DIR DOC_*.FRM
filename = "        "
@ 3, 0 SAY "Enter REPORT FORM filename: DOC_    .FRM"
@ 3,32 GET filename PICTURE "@!"
READ
* ---Remove the file extension.
```

```
filename = UPPER( filename + "." )
filename = TRIM( SUBSTR( filename,1,AT(".",filename)-1 ) )
IF "" = filename
    RETURN
ENDIF
filename = "DOC_" + filename + ".FRM"
* ---If the file does not exist, create it or exit.
IF .NOT. FILE( filename )
    choice = " "
    @ 3,0 CLEAR
    @ 3,0 SAY filename + " does not exist."
    WAIT
    RETURN
ENDIF
*
* ---Select index for Report.
IF NdxTotal > 1
    choice = " "
    @ 2,0 CLEAR
    @ 3,0 SAY "Select INDEX for Report? (y/n)";
        GET choice PICTURE "!"
    READ
    ndxchoice = "*"
    IF choice = "Y"
        * ---Select the index.
        DO DOC_NDXS WITH 4,ndxchoice
    ENDIF
ENDIF
*
* ---Get the FOR <exp>.
expr = ""
choice = " "
@ 2,0 CLEAR
@ 3,0 SAY "Specify a CONDITION on the output? (y/n)" GET choice PICTURE "!"
READ
IF choice = "Y"
    DO DOC_COND WITH expr
    IF "" <> TRIM( expr )
        * ---Check for valid LOGICAL expression.
        IF TYPE( expr ) <> "L"
            expr = ""
        ENDIF
    ENDIF
ENDIF
* ---Screen or printer selection.
choice = " "
@ 2,0 CLEAR
@ 3,0 SAY "Output to the (S)creen or (P)rinter?" GET choice PICTURE "!"
READ
isprinter = (choice = "P")
* ---Print the report.
GOTO TOP
DO CASE
CASE choice = " "
    RETURN
CASE isprinter
    @ 3,0 CLEAR
    @ 3,0 SAY "Printing report..."
    SET CONSOLE OFF
    IF "" <> TRIM( expr )
        REPORT FORM &filename FOR &expr HEADING expr;
            NOEJECT TO PRINT WHILE PausePRN(isprinter)
    ELSE
        REPORT FORM &filename NOEJECT TO PRINT WHILE PausePRN(isprinter)
    ENDIF
    EJECT
    SET CONSOLE ON
```

```
OTHERWISE
    SET COLOR TO &ScreenAtr
    CLEAR
    IF "" <> TRIM( expr )
        REPORT FORM &filename HEADING expr FOR &expr WHILE PausePRN(isprinter)
    ELSE
        REPORT FORM &filename WHILE PausePRN(isprinter)
    ENDIF
    WAIT
ENDCASE
IF savrecnum > 0
    GOTO savrecnum
ENDIF
RETURN
* EOF: DOC_REPO.PRG
```

I claim:

1. A litigation support computer system for use with documents having indicia, wherein formation regarding documents are stored in fields in records of an electronic database comprising:
   (i) an optical scanner means capable of recognizing said document indicia and generating a signal corresponding to said document indicia;
   (ii) means operatively coupling said scanner means to said electronic database such that said signal is stored in said database; and
   (iii) coding means including at least an authority list of indicia corresponding to data input candidates for said fields, said indicia being scannable with said scanner means so that said information is input in said database, whereby the authority list data is correlated to the document indicia.

2. The system of claim 1 wherein said indicia are bar codes.

3. The system of claim 1 or 2 wherein said indicia are numerical data.

4. The system of claim 1 or 2 wherein said indicia is alphabetical data.

5. The system of claim 1 or 2 wherein said optical scanner is hand-held.

6. The system of claim 5 wherein said optical scanner is a light wand.

7. The system of claim 5 wherein said scanner is a laser scanner.

8. The system of claim 1 wherein said document is selected from the group consisting of:
   (a) document;
   (b) court pleading;
   (c) physical exhibit; and
   (d) deposition transcript.

9. The system of claim 1, wherein said data input indicia correspond directly to said input data.

10. The system of claim 1, wherein said data input indicia is an analog of said data input, and said system includes means for converting said analog to database field information.

11. The system of claim 1, wherein said input data is ASCII data.

12. The system of claim 1, wherein said documents have an identifying scannable indicia thereon to provide input to one of said fields.

13. The system of claim 1, wherein said optical scanner has means for manually keying data.

14. A method of coding documents having information to be captured in fields in records of a database for use in a computer litigation support system comprising:

(b 1) providing a coding sheet carrying at least one authority list of scannable indicia;
   (2) providing a scanner capable of recognizing said indicia, said scanner being operatively coupled to an electronic database to permit said indicia to be input to said database;
   (3) providing each document with an identification indicia;
   (4) inputting said identification indicia to said database; and
   (5) scanning said coding sheet with said scanner to cause at least one selection from said authority list indicia to be input to said database.

15. The method of claim 14, wherein said scanner is a hand-held scanner.

16. The method of claim 14, wherein said identification step is performed by scanning an identification tag.

17. The method of claim 14 wherein said scanning step includes scanning multiple data fields.

18. The method of claim 17, wherein said multiple data field are scanned in a single scanning step.

19. The method of claim 14, wherein said scanner is an optical scanner.

20. The method of claim 14, wherein said coding sheet has multiple authority lists of scannable indicia.

21. The method of claim 14, wherein said scanning step is performed at multiple stations.

22. The method of claim 14, wherein said inputting step is performed at multiple stations.

23. A method of coding information regarding documents into fields in records of a database for use with documents having indicia in a computer litigation support system comprising:
   (1) providing a scanner capable of recognizing said document indicia, said scanner being operatively coupled to an electronic database to permit input to said database;
   (2) providing each document with said document identification indicia, said indicia being scannable;
   (3) scanning said identification indicia with said scanner to cause said identification indicia to be input to said database;
   (4) providing a coding sheet carrying at least one authority list of scannable indicia; and
   (5) inputting at least one additional data field regarding each of said documents into said electronic database by scanning said coding sheet.

24. The method of claim 23, wherein said inputting step is performed by scanning.

25. The method of claim 24 wherein said scanning step includes scanning multiple data fields.

26. The method of claim 25, wherein said multiple data fields are scanned in a single scanning step.

27. The method of claim 24, wherein said scanning input is performed by scanning a coding sheet having multiple authority lists of scannable indicia.

28. The method of claim 34, wherein said scanning step is performed at multiple stations.

29. The method of claim 23, wherein said scanner is an optical scanner.

30. The method of claim 23, wherein said scanner is a hand-held scanner.

* * * * *